(12) United States Patent
Itoi et al.

(10) Patent No.: US 12,187,910 B2
(45) Date of Patent: Jan. 7, 2025

(54) DISPERSANT COMPOSITION FOR ELECTRICITY STORAGE DEVICE ELECTRODES

(71) Applicant: Kao Corporation, Tokyo (JP)

(72) Inventors: Akito Itoi, Wakayama (JP); Kazuo Oki, Wakayama (JP); Kyoichi Shirota, Wakayama (JP)

(73) Assignee: KAO CORPORATION, Tokyo (JP)

(*) Notice: Subject to any disclaimer, the term of this patent is extended or adjusted under 35 U.S.C. 154(b) by 0 days.

(21) Appl. No.: 18/031,213

(22) PCT Filed: Oct. 6, 2021

(86) PCT No.: PCT/JP2021/036952
§ 371 (c)(1),
(2) Date: Apr. 11, 2023

(87) PCT Pub. No.: WO2022/080206
PCT Pub. Date: Apr. 21, 2022

(65) Prior Publication Data
US 2023/0383135 A1 Nov. 30, 2023

(30) Foreign Application Priority Data
Oct. 12, 2020 (JP) .................. 2020-172197

(51) Int. Cl.
| | |
|---|---|
| C09D 133/06 | (2006.01) |
| C08F 220/18 | (2006.01) |
| C08K 3/04 | (2006.01) |
| C08K 5/17 | (2006.01) |
| C09D 5/26 | (2006.01) |
| C09D 7/20 | (2018.01) |
| C09D 7/45 | (2018.01) |
| C09D 7/61 | (2018.01) |
| C09D 7/63 | (2018.01) |
| H01M 4/02 | (2006.01) |
| H01M 4/62 | (2006.01) |

(52) U.S. Cl.
CPC .... C09D 133/066 (2013.01); C08F 220/1818 (2020.02); C08K 3/041 (2017.05); C08K 5/17 (2013.01); C09D 5/26 (2013.01); C09D 7/20 (2018.01); C09D 7/45 (2018.01); C09D 7/61 (2018.01); C09D 7/63 (2018.01); H01M 4/625 (2013.01); C08F 2800/20 (2013.01); C08K 2201/001 (2013.01); C08K 2201/011 (2013.01); H01M 2004/028 (2013.01)

(58) Field of Classification Search
CPC ..... C09D 5/26; C09D 133/066; H01M 4/625; C08F 2800/20; C08F 220/54; C08F 220/1818; C08F 226/06; C08K 2201/001; C08K 2201/011; C08L 33/06; C08L 33/14

USPC ........................................................ 252/511
See application file for complete search history.

(56) References Cited

U.S. PATENT DOCUMENTS

| | | | | |
|---|---|---|---|---|
| 2017/0002213 A1* | 1/2017 | Markou | ............... | C09D 5/4457 |
| 2022/0173403 A1 | 6/2022 | Itoi et al. | | |

FOREIGN PATENT DOCUMENTS

| | | | | |
|---|---|---|---|---|
| CN | 106943947 B | * | 1/2021 | .......... B01F 17/0028 |
| CN | 112499618 A | | 3/2021 | |
| EP | 3 786 110 A1 | | 3/2021 | |
| JP | 2001-213671 A | | 8/2001 | |

(Continued)

OTHER PUBLICATIONS

Okada WO2019009242A1 translation (Year: 2019).*

(Continued)

*Primary Examiner* — Tri V Nguyen
(74) *Attorney, Agent, or Firm* — Birch, Stewart, Kolasch & Birch, LLP

(57) ABSTRACT

An aspect of the present disclosure relates to a dispersant composition for an electrode of a power storage device. The dispersant composition contains an acrylic polymer (A), a compound (B) represented by the following formula (1), and an organic solvent (C). The acrylic polymer (A) contains a constitutional unit a represented by the following formula (3). In the formula (1), $R^1$ represents a group represented by the following formula (2), and $R^2$ represents a hydrogen atom, an alkyl group having 1 to 4 carbon atoms, or —$CH_2CH_2$—OH. In the formula (2), $R^3$, $R^4$, $R^5$, and $R^6$ are the same or different and represent a hydrogen atom, a methyl group, or —$CH_2OH$.

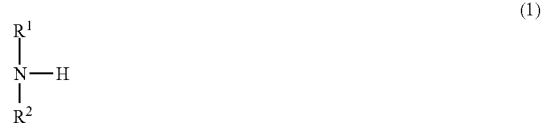

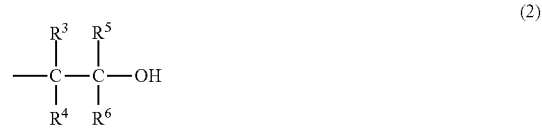

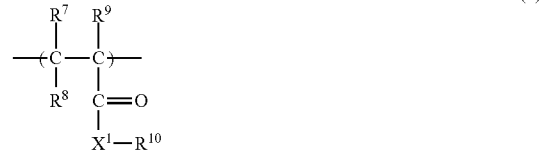

14 Claims, No Drawings

(56) References Cited

FOREIGN PATENT DOCUMENTS

| | | |
|---|---|---|
| JP | 2002282773 A * | 10/2002 |
| JP | 2005-281672 A | 10/2005 |
| JP | 2014-181140 A | 9/2014 |
| JP | 2015-128006 A | 7/2015 |
| JP | 6531928 B1 | 6/2019 |
| WO | WO 2013/151062 A1 | 10/2013 |
| WO | WO-2019009242 A1 * | 1/2019 |
| WO | WO 2020/208880 A1 | 10/2020 |

OTHER PUBLICATIONS

Ishibashi CN106943947B translation (Year: 2021).*
International Search Report (PCT/ISA/210), issued in PCT/JP2021/036952, dated Nov. 16, 2021.

* cited by examiner

DISPERSANT COMPOSITION FOR ELECTRICITY STORAGE DEVICE ELECTRODES

TECHNICAL FIELD

The present invention relates to a dispersant composition for an electrode of a power storage device.

BACKGROUND ART

In recent years, efforts to curb global warming have spurred the development of electric vehicles. Electric vehicles do not emit carbon dioxide, but have short mileage and long battery charging time, compared to gasoline-powered vehicles. To reduce the charging time, the rate of electron transfer in a positive electrode should be increased. At present, a carbon material is used as a conductive assistant (conductive material) for a positive electrode of a non-aqueous electrolyte battery. However, the use of the carbon material increases the viscosity of a conductive material slurry or positive electrode paste, which may lead to poor handleability. Therefore, a reduction in the viscosity of the slurry or paste is desirable.

JP 2014-181140 A (Patent Document 1) discloses a fine carbon fiber dispersion that contains fine carbon fibers, a dispersion medium (amide-based organic solvent), a polymer-based dispersant, and an organic basic compound with a pKa of 7.5 or more in water. Examples of the organic basic compound with a pKa of 7.5 or more include nitrogen-containing organic compounds having primary to tertiary amino groups. The polymer-based dispersant may be, e.g., methylcellulose, polyvinylpyrrolidone, or polyvinyl alcohol.

Japanese Patent No. 6531926 (Patent Document 2) discloses a carbon nanotube dispersion for an electrode. The carbon nanotube dispersion contains carbon nanotubes, polyvinylpyrrolidone, N-methyl-2-pyrrolidone, and an amine-based compound.

WO 2013/151062 A1 (Patent Document 3) relates to a positive electrode paste for a battery and discloses an acrylic polymer composed of monomers having a hydrocarbon group with 8 to 30 carbon atoms as a copolymer contained in the positive electrode paste.

DISCLOSURE OF INVENTION

An aspect of the present disclosure relates to a dispersant composition for an electrode of a power storage device. The dispersant composition contains an acrylic polymer (A), a compound (B) represented by the following formula (1), and an organic solvent (C). The acrylic polymer (A) contains a constitutional unit a represented by the following formula (3).

[Chemical Formula 1]

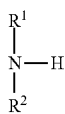

(1)

In the formula (1), $R^1$ represents a group represented by the following formula (2), and $R^2$ represents a hydrogen atom, an alkyl group having 1 to 4 carbon atoms, or —$CH_2CH_2$—OH.

[Chemical Formula 2]

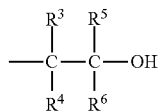

(2)

In the formula (2), $R^3$, $R^4$, $R^5$, and $R^6$ are the same or different and represent a hydrogen atom, a methyl group, or —$CH_2OH$.

[Chemical Formula 3]

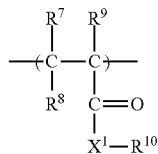

(3)

In the formula (3), $R^7$, $R^8$, and $R^9$ are the same or different and represent a hydrogen atom, a methyl group, or an ethyl group, $R^{10}$ represents a hydrocarbon group having 1 to 30 carbon atoms, and $X^1$ represents an oxygen atom or —NH—.

An aspect of the present disclosure relates to a carbon material-based conductive material slurry that contains carbon material-based conductive materials (D) and the dispersant composition of the present disclosure.

An aspect of the present disclosure relates to a positive electrode paste for a power storage device. The positive electrode paste contains the dispersant composition of the present disclosure.

An aspect of the present disclosure relates to a method for producing a positive electrode coating by using the positive electrode paste of the present disclosure.

DESCRIPTION OF THE INVENTION

In the technologies of Patent Documents 1 and 2, the positive electrode coating has a high resistance value. To form a better conductive path and a low resistance positive electrode coating, dispersants and additives are required that can reduce the viscosity of a slurry or paste containing carbon material-based conductive materials such as carbon nanotubes, i.e., the viscosity of a positive electrode paste or a carbon material dispersion.

With the foregoing in mind, in one aspect, the present disclosure provides a dispersant composition for an electrode of a power storage device that enables the preparation of a carbon material-based conductive material slurry and a positive electrode paste, both of which has a low viscosity and ease of handling.

[Dispersant Composition for Electrode of Power Storage Device]

The present disclosure is based on the findings that a dispersant composition that enables the preparation of a carbon material-based conductive material slurry and a positive electrode paste, both of which has a low viscosity and ease of handling, can be provided by using a specific acrylic polymer (A) and a specific compound (B) in combination.

An aspect of the present disclosure relates to a dispersant composition for an electrode of a power storage device (also referred to as a "dispersant composition of the present disclosure" in the following). The dispersant composition of the present disclosure contains an acrylic polymer (A), a compound (B) represented by the formula (1), and an organic solvent (C). The acrylic polymer (A) contains a constitutional unit a represented by the formula (3).

In one aspect, the present disclosure can provide the dispersant composition for an electrode of a power storage device that enables the preparation of a carbon material-based conductive material slurry and a positive electrode paste, both of which has a low viscosity and ease of handling. The dispersant composition of the present disclosure can be used to provide a low-viscosity, easy-to-handle positive electrode paste and carbon material-based conductive material slurry. Moreover, the positive electrode paste for a power storage device, which is prepared by using the dispersant composition of the present disclosure, can be used to produce a low resistance positive electrode coating.

The details of the mechanism of the effects of the present disclosure are not fully clear, but can be assumed as follows.

The acrylic polymer (A) may be adsorbed on the carbon material-based conductive materials by the hydrocarbon group having 1 to 30 carbon atoms to increase the dispersibility of the conductive materials. However, the acrylic polymer (A) does not cover the entire surface of each of the carbon material-based conductive materials, leaving some portions of the surface exposed. Adjacent carbon material-based conductive materials aggregate in an organic solvent due to a π-π interaction and a hydrogen bond between polar groups that are partially present on the surfaces of the respective conductive materials. In the present disclosure, the amine compound (B) having a hydroxyl group interacts with the polar groups (neutralization reaction or dipole interaction), and thus reduces the hydrogen bond between the carbon material-based conductive materials. Moreover, the amine (cation) interacts with π electrons of the carbon material-based conductive materials (cation-π interaction), and thus reduces the π-π interaction between the carbon material-based conductive materials. Since both the hydrogen bond and the π-π interaction are reduced, the dispersibility of the carbon material-based conductive materials can be improved, resulting in lower viscosity compared to the case where the compound (B) is not used.

The mechanism for reducing the resistance value of the positive electrode coating is considered as follows. The acrylic polymer (A) and the compound (B) each interact with the carbon material-based conductive materials. In other words, both of them are adsorbed on the surfaces of the carbon material-based conductive materials. Although the acrylic polymer (A) would be adsorbed in a patchy fashion, the acrylic polymer (A) combined with the compound (B) causes competitive adsorption between them on the surfaces of the carbon material-based conductive materials. Consequently, the adsorbed acrylic polymer (A) and compound (B) are each localized on the surface of the individual conductive materials. The adsorption area of the acrylic polymer (A) is smaller in the presence of the compound (B) than in the absence of the compound (B). The compound (B) is a low molecular compound and thus volatilizes or moves, along with the solvent, from the surfaces of the conductive materials when the positive electrode paste is applied and dried. Therefore, the portions of the surfaces of the conductive materials on which the compound (B) has been adsorbed are exposed, and the exposed portions serve as conductive contacts between the carbon material-based conductive materials. In the present disclosure, many exposed portions can be obtained compared to those obtained without the use of the compound (B). This may facilitate the formation of a conductive path, which in turn may reduce the resistance value of the positive electrode coating.

However, the present disclosure should not be construed as being limited to these mechanisms.

In one aspect, the present disclosure can provide the dispersant composition for an electrode of a power storage device that enables the preparation of the carbon material-based conductive material slurry and the positive electrode paste, both of which has a low viscosity and ease of handling.

<Acrylic Polymer (A)>

The acrylic polymer (A) contained in the dispersant composition of the present disclosure (also referred to as an "acrylic polymer of the present disclosure" in the following) contains a constitutional unit a, as described below. In one or more embodiments, the acrylic polymer of the present disclosure preferably further contains a constitutional unit b, as described below, from the viewpoint of improving the dispersibility of the carbon material-based conductive materials. In one or more embodiments, the acrylic polymer (A) of the present disclosure may be, e.g., a polymer containing the constitutional a or a copolymer containing the constitutional unit a and the constitutional unit b. The acrylic polymer (A) of the present disclosure may be of one type or a combination of two or more types.

(Constitutional Unit a)

The constitutional unit a is a constitutional unit represented by the following formula (3). The constitutional unit a may be of one type or a combination of two or more types. In the present disclosure, the constitutional unit a is a component of the acrylic polymer (A) that is to be adsorbed on the surfaces of the carbon material-based conductive materials.

[Chemical Formula 4]

In the formula (3), $R^7$, $R^8$, and $R^9$ are the same or different and represent a hydrogen atom, a methyl group, or an ethyl group, $R^{10}$ represents a hydrocarbon group having 1 to 30 carbon atoms, and $X^1$ represents an oxygen atom (—O—) or —NH—.

In the formula (3), $R^7$ and $R^8$ are each preferably a hydrogen atom and $R^9$ is preferably a hydrogen atom or a methyl group from the viewpoint of improving the adsorbability of the acrylic polymer (A) on the surfaces of the carbon material-based conductive materials. From the same viewpoint, $X^1$ is preferably an oxygen atom.

The hydrocarbon group of $R^{10}$ is preferably an alkyl group or an alkenyl group from the viewpoint of improving the adsorbability of the acrylic polymer (A) on the surfaces of the carbon material-based conductive materials. From the same viewpoint, the carbon number of $R^{10}$ is 1 or more, preferably 6 or more, more preferably 8 or more, even more preferably 12 or more, and further preferably 14 or more. From the same viewpoint, the carbon number of $R^{10}$ is preferably 30 or less, more preferably 24 or less, and further preferably 22 or less. From the same viewpoint, the carbon number of $R^{10}$ is preferably 6 to 30, more preferably 8 to 30, even more preferably 12 to 24, and further preferably 14 to 22. From the same viewpoint, examples of $R^{10}$ include an octyl group, a 2-ethylhexyl group, a decyl group, a lauryl group, a myristyl group, a cetyl group, a stearyl group, an oleyl group, and a behenyl group.

In one or more embodiments, examples of a monomer that forms the constitutional unit a (also referred to as a "monomer a" in the following) include the following: ester compounds such as 2-ethylhexyl(meth)acrylate, octyl(meth)acrylate, lauryl(meth)acrylate, stearyl (meth)acrylate, isostearyl(meth)acrylate, and behenyl(meth)acrylate; and amide compounds such as 2-ethylhexyl(meth)acrylamide, octyl(meth)acrylamide, lauryl(meth)acrylamide, stearyl (meth)acrylamide, and behenyl(meth)acrylamide. In particular, from the viewpoint of improving the dispersibility of the carbon material-based conductive materials and facilitating the introduction of the constitutional unit a into the acrylic polymer, the monomer a is preferably at least one selected from lauryl(meth)acrylate, stearyl(meth)acrylate, and behenyl (meth)acrylate, more preferably at least one selected from stearyl(meth)acrylate and behenyl (meth)acrylate, even more preferably at least one selected from stearyl methacrylate (SMA) and behenyl acrylate (BeA), and further preferably stearyl methacrylate.

The content of the constitutional unit a in all the constitutional units of the acrylic polymer (A) is preferably 10% by mass or more, more preferably 15% by mass or more, and further preferably 20% by mass or more from the viewpoint of improving the adsorbability of the acrylic polymer (A) on the surfaces of the carbon material-based conductive materials and improving the dispersibility of the carbon material-based conductive materials. From the same viewpoint, the content of the constitutional unit a is preferably 80% by mass or less, more preferably 75% by mass or less, and further preferably 70% by mass or less. From the same viewpoint, the content of the constitutional unit a is preferably 10 to 80% by mass, more preferably 15 to 75% by mass, and further preferably 20 to 70% by mass. When the constitutional unit a is a combination of two or more types, the content of the constitutional unit a is the total content of the two or more types.

In the present disclosure, the content of the constitutional unit a in all the constitutional units of the acrylic polymer (A) can be considered as the ratio of the amount of the monomer a used to the total amount of the monomers used for polymerization.

(Constitutional Unit b)

The constitutional unit b is at least one constitutional unit selected from a constitutional unit b1 represented by the following formula (4) and a constitutional unit b2 represented by the following formula (5). The constitutional unit b may be of one type or a combination of two or more types. In the present disclosure, the constitutional unit b is a component of the acrylic polymer (A) that is not adsorbed on the surfaces of the carbon material-based conductive materials, but contributes to steric repulsion.

[Chemical Formula 5]

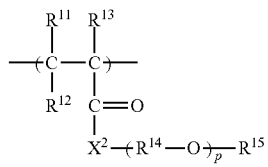

(4)

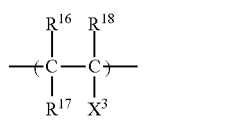

(5)

In the formula (4), $R^{11}$, $R^{12}$, and $R^{13}$ are the same or different and represent a hydrogen atom, a methyl group, or an ethyl group, $X^2$ represents an oxygen atom, $R^{14}$ represents a linear or branched alkylene group having 2 to 4 carbon atoms, p represents 1 to 8, and $R^{15}$ represents a hydrogen atom or a methyl group. In the formula (4), p is preferably 8 or less, more preferably 6 or less, and further preferably 4 or less from the viewpoint of the surface coverage of the carbon material-based conductive materials.

In the formula (5), $R^{16}$, $R^{17}$, and $R^{18}$ are the same or different and represent a hydrogen atom, a methyl group, or an ethyl group, and $X^3$ represents an amide group or a pyridinyl group that may have a hydrocarbon group having 1 to 4 carbon atoms.

(Constitutional Unit b1)

The constitutional unit b1 represented by the formula (4) may be of one type or a combination of two or more types.

The constitutional unit b1 may have, e.g., a structure derived from a nonionic monomer or a structure into which a nonionic group is introduced after polymerization.

Examples of a monomer that forms the constitutional unit b1 (also referred to as a "monomer b1" in the following) include the following: 2-hydroxyethylmethacrylate, methoxyethyl methacrylate, methoxy polyethylene glycol (meth)acrylate, methoxy poly(ethylene glycol/propylene glycol) mono(meth)acrylate, ethoxy poly(ethylene glycol/propylene glycol) mono(meth)acrylate, polyethylene glycol mono(meth)acrylate, and polypropylene glycol mono(meth)acrylate. Among them, the monomer b1 is preferably at least one selected from 2-hydroxyethyl methacrylate (HEMA), methoxy polyethylene glycol(meth)acrylate (PEGMA), and methoxyethyl methacrylate from the viewpoint of steric repulsion and the solubility of the acrylic polymer in an organic solvent. The monomer b1 may be of one type or a combination of two or more types.

(Constitutional Unit b2)

The constitutional unit b2 represented by the formula (5) may be of one type or a combination of two or more types.

A monomer that forms the constitutional unit b2 (also referred to as a "monomer b2" in the following) in the synthesis of the acrylic polymer (A) is preferably at least one selected from 4-vinylpyridine (4-Vpy), 2-vinylpyridine (2-Vpy), acrylamide, and methacrylamide (MAAm), and more preferably at least one selected from 4-vinylpyridine (4-Vpy) and methacrylamide (MAAm) from the viewpoint of steric repulsion and the solubility of the acrylic polymer in an organic solvent. The monomer b2 may be of one type or a combination of two or more types.

When the acrylic polymer (A) of the present disclosure contains the constitutional unit b, the content of the constitutional unit b in all the constitutional units of the acrylic polymer (A) is preferably 20% by mass or more, more preferably 25% by mass or more, and further preferably 30% by mass or more from the viewpoint of improving the dispersibility due to steric repulsion. From the same viewpoint, the content of the constitutional unit b is preferably 90% by mass or less, more preferably 85% by mass or less, and further preferably 80% by mass or less. From the same viewpoint, the content of the constitutional unit b is preferably 20 to 90% by mass, more preferably 25 to 85% by mass, and further preferably 30 to 80% by mass. When the constitutional unit b is a combination of two or more types, the content of the constitutional unit b is the total content of the two or more types. In the present disclosure, the content of the constitutional unit b in all the constitutional units of the acrylic polymer (A) can be considered as the ratio of the amount of the monomer b used to the total amount of the monomers used for polymerization.

The acrylic polymer (A) of the present disclosure may further contain another constitutional unit other than the constitutional unit a and the constitutional unit b as long as the effects of the present disclosure can be achieved. The total content of the constitutional unit a and the constitutional unit b in all the constitutional units of the acrylic polymer (A) is preferably 30% by mass or more, more preferably 50% by mass or more, even more preferably substantially 100% by mass, and further preferably 100% by mass from the viewpoint of improving the dispersibility of the carbon material-based conductive materials.

When the acrylic polymer (A) is a copolymer containing the constitutional unit a and the constitutional unit b, from the viewpoint of improving the dispersibility of the carbon material-based conductive materials, the preferred combinations of the constitutional unit a and the constitutional unit b are as follows.

SMA/HEMA
SMA/HEMA/PEGMA (EO2)
SMA/PEGMA (EO1)/MAAm
SMA/PEGMA (EO2)/MAAm
SMA/2-Vpy
SMA/4-Vpy
SMA/4-Vpy/MAAm
SMA/HEMA/MAAm
BeA/HEMA/MAAm

When the acrylic polymer (A) is a copolymer containing the constitutional unit a and the constitutional unit b, the arrangement of the constitutional unit a1 and the constitutional unit b can take any form of random, block, or graft.

<Production Method of Acrylic Polymer>

The synthesis method of the acrylic polymer (A) of the present disclosure is not particularly limited and may be any method that is usually used for the polymerization of (meth) acrylic acid esters and vinyl monomers. Examples of the synthesis method of the acrylic polymer (A) include a free radical polymerization method, a living radical polymerization method, an anionic polymerization method, and a living anionic polymerization method. For example, when the free radical polymerization method is used, the acrylic polymer (A) can be obtained by a known method such as solution polymerization of monomer components containing the monomer a and optionally the monomer b.

Examples of the solvent used in the above polymerization include organic solvents such as hydrocarbons (hexane and heptane), aromatic hydrocarbons (toluene, xylene, etc.), lower alcohols (ethanol, isopropanol, etc.), ketones (acetone and methylethylketone), ethers (tetrahydrofuran and diethylene glycol dimethyl ether), and N-methylpyrrolidone. The amount of the solvent is preferably 0.5 to 10 times the total amount of the monomers, which is expressed in mass ratio. The polymerization initiator used in the above polymerization may be any known radical polymerization initiator. Examples of the polymerization initiator include azo polymerization initiators, hydroperoxides, dialkylperoxides, diacyl peroxides, and ketone peroxides. The amount of the polymerization initiator is preferably 0.01 to 5 mol %, more preferably 0.05 to 4 mol %, and further preferably 0.1 to 3 mol % with respect to the total amount of the monomer components. The polymerization reaction is preferably performed at a temperature of 40 to 180'C under a nitrogen flow, and the reaction time is preferably 0.5 to 20 hours.

Moreover, any known chain transfer agent may be used in the above polymerization. Examples of the chain transfer agent include isopropyl alcohol and a mercapto compound such as mercaptoethanol.

In the present disclosure, the content of the constitutional unit a in all the constitutional units of the acrylic polymer (A) can be considered as the ratio of the amount of the monomer a used to the total amount of the monomers used for polymerization. The content of the constitutional unit b in all the constitutional units of the acrylic polymer (A) can be considered as the ratio of the amount of the monomer b used to the total amount of the monomers used for polymerization. The total content of the constitutional unit a and the constitutional unit b in all the constitutional units of the acrylic polymer (A) can be considered as the ratio of the total amount of the monomer a and the monomer bused to the total amount of the monomers used for polymerization.

The weight average molecular weight of the acrylic polymer (A) of the present disclosure is preferably 5000 or more, more preferably 7000 or more, and further preferably 10000 or more from the viewpoint of improving the dispersibility of the carbon material-based conductive materials and the solubility of the acrylic polymer in an organic solvent. From the same viewpoint, the weight average molecular weight of the acrylic polymer (A) is preferably 1000000 or less, more preferably 500000 or less, even more preferably 300000 or less, still more preferably 100000 or less, and further preferably 60000 or less. From the same viewpoint, the weight average molecular weight of the acrylic polymer (A) is preferably 5000 to 1000000, more preferably 7000 to 500000, even more preferably 10000 to 300000, still more preferably 10000 to 100000, and further preferably 10000 to 60000. In the present disclosure, the weight average molecular weight is a value measured by GPC (gel permeation chromatography) and the details of the measurement conditions will be described in Examples.

The content of the acrylic polymer (A) in the dispersant composition of the present disclosure is preferably 5% by mass or more, more preferably 10% by mass or more, and further preferably 15% by mass or more from the viewpoint of improving the dispersibility of the carbon material-based conductive materials. Furthermore, the content of the acrylic polymer (A) is preferably 50% by mass or less, more preferably 40% by mass or less, and further preferably 30% by mass or less from the viewpoint of the solubility of the acrylic polymer in an organic solvent. When the acrylic polymer (A) is a combination of two or more types, the content of the acrylic polymer (A) is the total content of the two or more types.

<Compound (B)>

The compound (B) contained in the dispersant composition of the present disclosure is a compound represented by the following formula (1)(also referred to as a "compound (B) of the present disclosure" in the following).

[Chemical Formula 6]

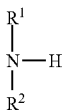
(1)

In the formula (1), $R^1$ represents a group represented by the following formula (2), and $R^2$ represents a hydrogen atom, an alkyl group having 1 to 4 carbon atoms, or —CH$_2$CH$_2$—OH.

[Chemical Formula 7]

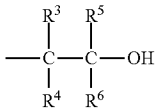
(2)

In the formula (2), $R^3$, $R^4$, $R^5$, and $R^6$ are the same or different and represent a hydrogen atom, a methyl group, or —CH$_2$OH.

The compound (primary or secondary amine) represented by the formula (1) of the present disclosure is superior to a tertiary amine in which hydrogen of the formula (1) is replaced by a carbon atom. The reason for this may be that the compound represented by the formula (1) has small steric hindrance and can easily interact with π electrons of the carbon material-based conductive materials, which can facilitate the interaction between cations derived from the compound (B) and π electrons derived from the carbon material-based conductive materials. In the formula (1) representing a primary or secondary amine, $R^2$ is preferably a hydrogen atom (primary amine), an alkyl group having 1 to 4 carbon atoms (secondary amine), or —CH$_2$CH$_2$—OH (secondary amine), and more preferably a hydrogen atom, an alkyl group having 1 carbon atom, or an alkyl group having 2 carbon atoms from the viewpoint of reducing the viscosity. This may be because the hydrogen atom, the methyl group, or the ethyl group has small steric hindrance and can easily interact with π electrons of the carbon material-based conductive materials, which can facilitate the interaction between cations derived from the compound (B) and π electrons derived from the carbon material-based conductive materials.

In formula (2), $R^3$, $R^4$, $R^5$ and $R^6$ are the same or different and are each preferably a hydrogen atom or a methyl group from the viewpoint of reducing the viscosity. The hydrogen atom or the methyl group has small steric hindrance and can easily interact with π electrons of the carbon material-based conductive materials, which can facilitate the interaction (cation-π interaction) between cations derived from the compound (B) and π electrons derived from the carbon material-based conductive materials.

In one or more embodiments, the compound (B) of the present disclosure is at least one compound selected from ethanolamine, N-methylethanolamine, N-ethylethanolamine, 2-amino-1-propanol, 2-amino-2-methyl-1-propanol, 1-amino-2-propanol, 2-amino-1,3-propanediol, and diethanolamine. Among them, the compound (B) is preferably at least one selected from ethanolamine, N-methylethanolamine, N-ethylethanolamine, 2-amino-2-methyl-1-propanol, 1-amino-2-propanol, and diethanolamine, and more preferably at least one selected from N-methylethanolamine, N-ethylethanolamine, and 2-amino-2-methyl-1-propanol from the viewpoint of improving the dispersibility of the conductive materials and reducing the viscosity of the positive electrode paste.

In one or more embodiments the content of the compound (B) in the dispersant composition of the present disclosure is preferably 2.3% by mass or more, more preferably 4% by mass or more, and further preferably 5% by mass or more from the viewpoint of the effect of reducing the viscosities of the conductive material slurry and the positive electrode paste. Furthermore, the content of the compound (B) is preferably 43% by mass or less, more preferably 30% by mass or less, and further preferably 20% by mass or less from the viewpoint of uniform solubility of the acrylic polymer. When the compound (B) is a combination of two or more types, the content of the compound (B) is the total content of the two or more types.

In one or more embodiments the content of the compound (B) in the dispersant composition of the present disclosure is preferably 10 parts by mass or more, more preferably 20 parts by mass or more, and further preferably 30 parts by mass or more with respect to 100 parts by mass of the acrylic polymer (A) from the viewpoint of the effect of reducing the viscosities of the conductive material slurry and the positive electrode paste. Furthermore, the content of the compound (B) is preferably 210 parts by mass or less, more preferably 150 parts by mass or less, and further preferably 110 parts by mass or less with respect to 100 parts by mass of the acrylic polymer (A) from the viewpoint of the solubility of the acrylic polymer.

The mass ratio A/B of the acrylic polymer (A) to the compound (B) in the dispersant composition of the present disclosure is preferably 0.1 or more, more preferably 0.3 or more, even more preferably 0.5 or more, and further preferably 0.8 or more from the viewpoint of improving the dispersibility of the conductive materials. Furthermore, the mass ratio A/Bis preferably 10 or less, more preferably 5 or less, and further preferably 3 or less from the viewpoint of high conductive properties.

<Organic Solvent (C)>

In one or more embodiments, the dispersant composition of the present disclosure may further contain an organic solvent (C). The organic solvent (C) is preferably an organic solvent that is able to dissolve a binder (binder resin) contained in the positive electrode paste. Examples of the organic solvent (C) include the following: amide-based polar organic solvents such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, and octanol; glycols such as ethylene glycol, diethylene glycol, triethylene glycol, propylene glycol, 1,3-propanediol, 1,3-butanediol, 1,5-pentanediol, and hexylene glycol; polyhydric alcohols such as glycerol, trimethylolpropane, pentaerythritol, and sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutylether, diethylene glycol monobutylether, triethylene glycol monobutylether, and tetraethylene glycol monobutyl ether; ketones such as acetone, methyl ethyl ketone, methyl propylketone, and cyclopentanone; and esters such as ethyl acetate, γ-butyrolactone, and ε-propiolactone. The organic solvent (C) may be of one type or a combination of two or more types.

In one or more embodiments, the content of the organic solvent (C) in the dispersant composition of the present disclosure is preferably 30% by mass or more, more preferably 50% by mass or more, and further preferably 65% by mass or more from the viewpoint of the solubility of the acrylic polymer (A). Furthermore, the content of the organic solvent (C) is preferably 80% by mass or less, more preferably 78% by mass or less, and further preferably 75% by mass or less from the viewpoint of uniform solubility of the acrylic polymer (A) and the compound (B).

The dispersant composition of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder (with a structure different from the acrylic polymer (A)).

[Conductive Material Slurry]

An aspect of the present disclosure relates to a conductive material slurry (also referred to as a "conductive material slurry of present disclosure" in the following). The conductive material slurry of the present disclosure contains carbon material-based conductive materials (D) and the dispersant composition of the present disclosure. In this aspect, the preferred embodiments of the dispersant composition of the present disclosure are as described above. In one or more embodiments, the conductive material slurry of the present disclosure contains the acrylic polymer (A) of the present disclosure, the compound (B) of the present disclosure, the organic solvent (C), and the carbon material-based conductive materials (D), as will be described below.

<Carbon Material-Based Conductive Material (D)>

In one or more embodiments, examples of the carbon material-based conductive materials (D) include carbon nanotubes (also referred to as "CNTs" in the following), carbon black, graphite, and graphene. Among them, the carbon material-based conductive materials (D) are preferably at least one selected from carbon black, carbon nanotubes, and graphene from the viewpoint of achieving high conductive properties. From the same viewpoint, the carbon material-based conductive materials (D) are more preferably carbon nanotubes or graphene. The carbon material-based conductive materials (D) may be of one type or a combination of two or more types.

(Carbon Nanotube)

The average diameter of the carbon nanotubes (CNTs) that can be used as the carbon material-based conductive materials (D) of the present disclosure is not particularly limited and is preferably 2 nm or more, more preferably 3 nm or more, and further preferably 5 nm or more from the viewpoint of improving the dispersibility of the CNTs. Furthermore, the average diameter of the CNTs is preferably 100 nm or less, more preferably 70 nm or less, and further preferably 50 nm or less from the viewpoint of improving the conductive properties. From the same viewpoint, the average diameter of the CNTs is preferably 2 to 100 nm, more preferably 3 to 70 nm, and further preferably 5 to 50 nm. In the present disclosure, the average diameter of the CNTs may be measured with a scanning electron microscope (SEI) or anatomic force microscope (AFM).

The carbon nanotubes (CNTs) that can be used as the carbon material-based conductive materials (D) may include two or more types with different diameters in order to achieve both the conductive properties and the dispersibility. When the CNTs are of two or more types with different diameters, the average diameter of the relatively thin CNTs is preferably 2 nm or more, more preferably 3 nm or more, and further preferably 5 nm or more from the viewpoint of the dispersibility. Furthermore, the average diameter of the relatively thin CNTs is preferably 29 nm or less, more preferably 25 nm or less, and further preferably 20 nm or less from the viewpoint of the conductive properties. On the other hand, the average diameter of the relatively thick CNTs is preferably 30 nm or more, more preferably 35 nm or more, and further preferably 40 nm or more from the viewpoint of the dispersibility. Furthermore, the average diameter of the relatively thick CNTs is preferably 100 nm or less, more preferably 70 nm or less, and further preferably 50 nm or less from the viewpoint of the conductive properties.

In the present disclosure, the carbon nanotubes (CNTs) mean the whole of a plurality of types of carbon nanotubes. The form of the CNTs used in the preparation of the conductive material slurry is not particularly limited. For example, a plurality of types of CNTs may be present independently or may be bundled or entangled with each other. Alternatively, these forms of CNTs may be combined together. The CNTs may have various number of layers or various diameters. The CNTs may contain impurities (such as a catalyst and amorphous carbon) derived from the process of producing the CNTs.

In one or more embodiments, each of the carbon nanotubes (CNTs) that can be used as the carbon material-based conductive materials (D) is a single sheet of graphite rolled into a cylinder. A CNT consisting of a single layer of graphite is called a single-walled carbon nanotube (SW carbon nanotube), a CNT consisting of two layers of graphite is called a double-walled carbon nanotube (DW carbon nanotube), and a CNT consisting of three or more layers of graphite is called a multi-walled carbon nanotube (MW carbon nanotube). Any of the single-, double-, and multi-walled carbon nanotubes and a mixture of them can be used depending on the properties required for a positive electrode coating that is formed by using the positive electrode paste containing a carbon nanotube dispersion. The positive electrode coating is a film-like layer obtained by applying the positive electrode paste to an electrode substrate (current collector).

Examples of the CNTs that can be used as the carbon material-based conductive materials (D) include the following: NC-7000 (9.5 nm: hereinafter, the number in parentheses indicates the average diameter) and NX7100 (10 nm) manufactured by NanocylSA FT6100 (9 nm), FT-6110 (9 nm), FT-6120 (9 nm), FT-7000 (9 nm), FT-7010 (9 nm), FT-7320 (9 nm), FT-9000 (12.5 nm), FT-9100 (12.5 nm), FT-9110 (12.5 nm), FT-9200 (19 nn), and FT-9220 (19 nm) manufactured by Jiangsu Cnano Technology Ltd.; HCNTs4 (4.5 nm), CNTs5 (7.5 nm), HCNTs5 (7.5 nm), GCNTs5 (7.5 nm), HCNTs10 (15 nm), CNTs20 (25 nm), and CNTs40 (40 nm) manufactured by Cabot Performance Materials (Shenzhen) Co., Ltd.; CTUBE 170 (13.5 nm), CTUBE 199 (8 nm), CTUBE 298 (10 nm) manufactured by Korea CNT Co., Ltd.; K-Nanos 100P (11.5 nm) manufactured by Korea Kumho PetrochemicalCo., Ltd.; CP-1001M (12.5 nm) and BT-1003M (12.5 nm) manufactured by LD Chem; and 3003 (10 nm) and 3021 (20 nm) manufactured by Nano-Tech Port Co., Ltd.

Examples of the combination of two types of CNTs include the following: a combination of CNTs40 (40 nm) and HCNTs4 (4.5 nm) or HCNTs5 (7.5 nm) from Cabot Performance Materials (Shenzhen) Co., Ltd.; a combination of CNTs40 (40 nm) and GCNTs5 (7.5 nm) from Cabot Performance Materials (Shenzhen) Co., Ltd.; a combination of CNTs40 (40 nm) and FT-7010 (9 nm) from Jiangsu Cnano Technology Ltd.; a combination of CNTs40 (40 nm) and FT-9100 (12.5 nm) from Jiangsu Cnano Technology Ltd.; and a combination of CNTs40 (40 nm) and BT-1003M (12.5 nm) from LG Chem.

(Carbon Black)

Various types of carbon black, including furnace black, channel black, thermal black, acetylene black, and Ketjenblack, can be used as the carbon material-based conductive materials (D) of the present disclosure. In addition, common oxidized carbon black and hollow carbon can also be used. The oxidation treatment of carbon is generally performed to improve the dispersibility of carbon. In the oxidation treatment, carbon is treated at a high temperature in the air or secondarily treated with, e.g., nitric acid, nitrogen dioxide, or ozone, so that oxygen-containing polar functional groups such as phenol, quinone, carboxyl, and carbonyl groups are directly introduced (covalently bonded) to the surface of carbon. However, in general the larger the amount of the functional groups introduced, the lower the conductive properties of carbon. Therefore, carbon that has not been subjected to the oxidation treatment is preferably used.

As the specific surface area of the carbon black that can be used as the carbon material-based conductive materials (D) becomes larger, the points of contact between carbon black particles are increased, which is advantageous in reducing the internal resistance of an electrode. Specifically, the specific surface area (BET) is determined from the amount of nitrogen adsorption, and is preferably 20 m$^2$/g or more and 1500 m$^2$/g or less, more preferably 50 m$^2$/g or more and 1000 m$^2$/g or less, and further preferably 100 m$^2$/g or more and 800 m$^2$/g or less.

The primary particle size (diameter) of the carbon black that can be used as the carbon material-based conductive materials D) is preferably 5 to 1000 nm, and more preferably 10 to 200 nm from the viewpoint of the conductive properties. In the present disclosure, the primary particle size of the carbon black is the average of the particle sizes measured with, e.g., an electron microscope.

Examples of the carbon black that can be used as the carbon material-based conductive materials (D) include, but are not limited to, the following: TOKABLACK #4300, #4400, #4500, #5500, etc. (manufactured by TOKAI CARBON CO., LTD., furnace black); Printex L etc. (manufactured by Degussa AG, furnace black); Raven 7000, 5750, 5250, 5000 Ultra III, 5000 Ultra, etc., Conductex SC Ultra, Conductex 975 Ultra, etc. (manufactured by Columbian Chemicals Co., furnace black); #2350, #2400B, #30050B, #3030B, #3230B, #3350B, #3400B, #5400B, etc. (manufactured by Mitsubishi Chemical Corporation, furnace black); MONARCH 1400, 1300, 900, VULCANXC-72P9 BLACK PEARLS 2000, etc. (manufactured by Cabot Corporation, furnace black); ENSACO 250G, ENSACO 260G, ENSACO 350G, SUPER P-Li (manufactured by TIMCAL Ltd.), Ketjenblack EC-300J, EC-600JD (manufactured by Akzo Co., Ltd.); and DENKA BLACK, DENKA BLACK HS-100, FX-35, Li-100, Li-250, Li-400, Li-435 (manufactured by Denka Company Limited, acetylene black).

(Graphene)

The graphene that can be used as the carbon material-based conductive materials (D) of the present disclosure generally refers to a sheet of sp$^2$-bonded carbon atoms with a thickness of one atom (i.e., single-layer graphene). In the present disclosure, the graphene also includes a flaky substance having a layered structure of single-layer graphene sheets.

The thickness of the graphene that can be used as the carbon material-based conductive materials (D) is not particularly limited and is preferably 100 nm or less, more preferably 50 nm or less, and further preferably 20 nm or less. The size of a graphene sheet in the direction parallel to the graphene layer is not particularly limited. However, a conductive path per graphene becomes shorter when the graphene is too small. This may lead to poor conductive properties due to the influence of contact resistance between graphene sheets. Therefore, the graphene of the present disclosure is preferably larger than a certain degree. The size of a graphene sheet in the direction parallel to the graphene layer is preferably 0.5 µm or more, more preferably 0.7 µm or more, and further preferably 1 µm or more. In this case, the size of a graphene sheet in the direction parallel to the graphene layer means the average of the maximum diameter and the minimum diameter of the graphene sheet when observed in the direction perpendicular to the plane direction of the graphene sheet.

The content of the carbon material-based conductive materials (D) in the conductive material slurry of the present disclosure is preferably 1% by mass or more, more preferably 2% by mass or more, and further preferably 3% by mass or more from the viewpoint of improving the convenience of adjusting the concentration of the positive electrode paste. Furthermore, the content of the carbon material-based conductive materials (D) is preferably 10% by mass or less, more preferably 8% by mass or less, and further preferably 7% by mass or less from the viewpoint of making the viscosity of the conductive material slurry suitable for easy handling. From the same viewpoint, the content of the carbon material-based conductive materials (D) is preferably 1 to 10% by mass, more preferably 2 to 8% by mass, and further preferably 3 to 7% by mass.

<Acrylic Polymer (A) in Conductive Material Slurry>

The content of the acrylic polymer (A) in the conductive material slurry of the present disclosure is preferably 0.1 part by mass or more, more preferably 1 part by mass or more, and further preferably 5 parts by mass or more with respect to 100 parts by mass of the carbon material-based conductive materials (D) from the viewpoint of improving the dispersibility of the carbon material-based conductive materials (D). Furthermore, the content of the acrylic polymer (A) is preferably 200 parts by mass or less, more preferably 100 parts by mass or less, and further preferably 50 parts by mass or less with respect to 100 parts by mass of the carbon material-based conductive materials (D) from the viewpoint of high conductive properties. From the same viewpoint, the content of the acrylic polymer (A) is preferably 0.1 to 200 parts by mass, more preferably 1 to 100 parts by mass, and further preferably 5 to 50 parts by mass with respect to 100 parts by mass of the carbon material-based conductive materials (D).

<Compound (B) in Conductive Material Slurry>

The content of the compound (B) in the conductive material slurry of the present disclosure is preferably 0.5 part by mass or more, more preferably 1.0 part by mass or more, even more preferably 5 parts by mass or more, still more preferably 10 parts by mass or more, yet more preferably 20 parts by mass or more, and further preferably 30 parts by mass or more with respect to 100 parts by mass of the carbon material-based conductive materials (D) from the viewpoint of improving the dispersibility of the carbon material-based conductive materials (D). Furthermore, the content of the compound (B) is preferably 2000 parts by mass or less, more preferably 1000 parts by mass or less, even more preferably 500 parts by mass or less, still more preferably 100 parts by mass or less, yet more preferably 70 parts by mass or less, much more preferably 60 parts by mass or less, and further preferably 50 parts by mass or less with respect to 100 parts by mass of the carbon material-based conductive materials D) from the viewpoint of high conductive properties. From the same viewpoint, the content of the compound (B) is preferably 0.5 to 2000 parts by mass, more preferably 1.0 to 1000 parts by mass, even more preferably 5 to 500 parts by mass, still more preferably 5 to 100 parts by mass, yet more preferably 10 to 70 parts by mass, much more preferably 20 to 60 parts by mass, and further preferably 30 to 50 parts by mass with respect to 100 parts by mass of the carbon material-based conductive materials (D).

<Production Method of Conductive Material Slurry>

In one or more embodiments, the conductive material slurry of the present disclosure may be prepared by mixing the dispersant composition and the carbon material-based conductive materials (D) of the present disclosure, and optionally a solvent, with a mixing and dispersing machine. The solvent may be the same as the organic solvent (C) that can be used in the preparation of the dispersant composition of the present disclosure, as described above. The mixing and dispersing machine may be at least one selected from, e.g., an ultrasonic homogenizer, a vibration mill, a jet mill, a ball mill, a bead mill, a sand mill, a roll mill, a homogenizer, a high-pressure homogenizer, an ultrasonic device, an attritor, a dissolver, and a paint shaker. Some of the components of the conductive material slurry may be mixed first, and then the mixture may be blended with the remainder. Moreover, all the components of the conductive material slurry do not have to be added at ono, but may be divided and added multiple times. The carbon material-based conductive materials (D) may be in a dry state or may contain a solvent. The solvent may be the same as the organic solvent (C) described above.

In the present disclosure, the viscosity of the conductive material slurry at 25° C. is preferably as low as possible. When the content of the carbon material-based conductive materials (D) is 5% by mass, e.g., the viscosity of the conductive material slurry at 25° C. is preferably 0.02 Pa·s or more, more preferably 0.05 Pa·s or more, and further preferably 0.2 Pa·s or more from the viewpoint of sedimentation properties or the like. Furthermore, when the content of the carbon material-based conductive materials (D) is 5% by mass, the viscosity of the conductive material slurry at 25° C. is preferably 50 Pa·s or less, more preferably 20 Pa·s or less, and further preferably 10 Pa·s or less from the viewpoint of improving the handleability in the preparation of the positive electrode paste.

[Positive Electrode Paste]

An aspect of the present disclosure relates to a positive electrode paste for a power storage device (also referred to as a "positive electrode paste of the present disclosure" in the following). The positive electrode paste of the present disclosure contains the dispersant composition of the present disclosure. In this aspect, the preferred embodiments of the dispersant composition of the present disclosure are as described above. In one or more embodiments, the positive electrode paste of the present disclosure contains the acrylic polymer (A) of the present disclosure, the compound (B) of the present disclosure, the organic solvent (C), and the carbon material-based conductive materials (D).

In one or more embodiments, the positive electrode paste of the present disclosure may further contain a positive electrode active material and a binder.

In one or more embodiments, the positive electrode paste of the present disclosure may further contain conductive materials other than the carbon material-based conductive materials (D). The conductive materials other than the carbon material-based conductive materials (D) include, e.g., conductive polymers such as polyaniline.

<Positive Electrode Active Material>

The positive electrode active material may be any inorganic compound such as a compound with an olivine structure or a lithium transition metal composite oxide. Examples of the compound with an olivine structure include compounds represented by the general formula $Li_xM1_sPO_4$ (where M1 represents a 3d transition metal, $0 \leq x \leq 2$, and $0.8 \leq s \leq 1.2$). The compound with an olivine structure may be coated with, e.g., amorphous carbon. Examples of the lithium transition metal composite oxide include a lithium manganese oxide with a spinel structure and a lithium transition metal composite oxide that has a layered structure and is represented by the general formula $Li_xMO_2\text{-}\delta$ (where M represents a transition metal, $0.4 \leq x \leq 1.2$, and $0 \leq \delta \leq 0.5$). The transition metal M may be, e.g., Co, Ni, or Mn. The lithium transition metal composite oxide may further contain one or more than one element selected from Al, Mn, Fe, Ni, Co, Cr, Ti, Zn, P, and B.

The content of the positive electrode active material in the positive electrode paste of the present disclosure is not particularly limited as long as it can be adjusted in accordance with a suitable viscosity of the positive electrode paste that is applied to a current collector. The content of the positive electrode active material is preferably 40 to 90% by mass, more preferably 50 to 85% by mass, and further preferably 70 to 80% by mass from the viewpoint of the energy density and the stability of the positive electrode paste.

The content of the positive electrode active material in the total solid content of the positive electrode paste of the present disclosure is not particularly limited and may be the same as that of a positive electrode active material in the total solid content of a conventionally known positive electrode paste. The content of the positive electrode active material in the total solid content of the positive electrode paste is preferably 90.0% by mass or more in order to maintain the energy density of the battery at a high level, and is also preferably 99.9% by mass or less in order to ensure the conductive properties and coating properties of a composite layer. From the same viewpoint, the content of the positive electrode active material in the total solid content of the positive electrode paste is preferably 90.0 to 99.9% by mass.

<Binder (Binder Resin)>

The binder (binder resin) may be, e.g., polyvinylidene fluoride (PVDF), a vinylidene fluoride-hexafluoropropylene copolymer, styrene-butadiene rubber, or polyacrylonitrile. These materials may be used alone or in combination of two or more.

The content of the binder in the positive electrode paste of the present disclosure is preferably 0.05% by mass or more from the viewpoint of the coating properties of the composite layer and the binding properties of the composite layer to a current collector. Furthermore, the content of the binder is preferably 9.95% by mass or less from the viewpoint of maintaining the energy density of the battery at a high level.

<Acrylic Polymer (A) in Positive Electrode Paste>

The content of the acrylic polymer (A) in the positive electrode paste of the present disclosure is preferably 0.01 to 2.0% by mass more preferably 0.05 to 1.0% by mass and further preferably 0.07 to 0.5% by mass from the viewpoint of coating resistance.

<Compound (B) in Positive Electrode Paste>

The content of the compound (B) in the positive electrode paste of the present disclosure is preferably 0.012% by mass or more, and more preferably 0.02% by mass or more from the viewpoint of increasing the solid content concentration of the positive electrode paste and reducing the viscosity of the positive electrode paste. Furthermore, the content of the compound (B) is preferably 0.191% by mass or less, and more preferably 0.1% by mass or less from the viewpoint of the solubility of the compound (B) in a solvent and the stability of the positive electrode paste.

<Carbon Material-Based Conductive Material (D) in Positive Electrode Paste>

The content of the conductive materials (D) in the positive electrode paste of the present disclosure is preferably 0.01% by mass or more, more preferably 0.05% by mass or more, and further preferably 0.1% by mass or more from the viewpoint of the conducive properties of the composite layer. Furthermore, the content of the conductive materials (D) is preferably 5% by mass or less, more preferably 3% by mass or less, and further preferably 2% by mass or less from the viewpoint of maintaining the energy density of the battery at a high level.

In one or more embodiments, the positive electrode paste of the present disclosure can be prepared by mixing the positive electrode active material, the conductive material slurry of the present disclosure, the binder (binder resin), and a solvent (additional solvent) for adjusting the solid content or the like, and then stirring the mixture. Moreover, the mixture may further contain a dispersant other than the acrylic polymer (A) of the present disclosure or a functional material. Examples of the solvent (additional solvent) include non-aqueous solvents such as N-methyl-2-pyrrolidone (NMP), dimethylformamide (DMF), and dimethyl sulfoxide (DMSO) and water. In the preparation of the positive electrode paste, the solvent (additional solvent) is preferably a non-aqueous solvent, and more preferably NMP. For example, a planetary mixer, a bead mill, or a jet mill can be used, optionally in combination, for mixing and stirring.

The positive electrode paste of the present disclosure can also be prepared by premixing some of the components that are used to prepare the positive electrode paste, and then blending the mixture with the remainder. Moreover, all the components of the positive electrode paste do not have to be added at ono, but may be divided and added multiple times. This can reduce the mechanical load on the stirring device.

The solid content concentration of the positive electrode paste of the present disclosure, the amount of the positive electrode active material, the amount of the binder, the amount of the conductive material slurry, the amount of the additive components, and the amount of the solvent can be adjusted in accordance with a suitable viscosity of the positive electrode paste that is applied to a current collector. The amount of the solvent is preferably as small as possible from the viewpoint of drying properties. However, the viscosity of the positive electrode paste should not be too high from the viewpoint of the uniformity and surface smoothness of a positive electrode composite layer. On the other hand, the viscosity of the positive electrode paste should not be too low from the viewpoint of preventing it from drying out and ensuring a sufficient thickness of the composite layer (positive electrode coating).

It is preferable that the positive electrode paste of the present disclosure can be adjusted to a high concentration from the viewpoint of production efficiency. However, a significant increase in the viscosity of the positive electrode paste is not preferred in terms of workability. The use of additives can maintain a suitable viscosity range while keeping a high concentration of the positive electrode paste.

<Production Method of Positive Electrode Paste>

In one or more embodiments a method for producing a positive electrode paste of the present disclosure may include mixing the carbon material-based conductive material slurry of the present disclosure, the binder, the solvent, and the positive electrode active material. These components may be mixed in any order. In one or more embodiments, the positive electrode paste may also be produced in the following manner. The conductive material slurry of the present disclosure, the solvent, and the binder are mixed and dispersed until the mixture becomes homogeneous. Then, this mixture is blended with the positive electrode active material, and stirred until they become homogeneous. The order of adding the components is not limited to the above. The compound (B) may be added separately from the acrylic polymer (A) during the preparation of the positive electrode paste.

Each of the conductive material slurry and the positive electrode paste of the present disclosure may further contain other components to the extent that they do not interfere with the effects of the present disclosure. The other components include, e.g., an antioxidant, a neutralizer, an antifoaming agent, an antiseptic, a dehydrating agent, an anticorrosive agent, a plasticizer, and a binder.

[Production Method of Positive Electrode Coating or Positive Electrode for Battery]

An aspect of the present disclosure relates to a method for producing a positive electrode coating or a positive electrode for a battery by using the positive electrode paste of the present disclosure. This aspect includes applying the positive electrode paste to a current collector, and then drying the positive electrode paste. In this aspect, the preferred embodiments of the positive electrode paste of the present disclosure are as described above. The positive electrode coating or the positive electrode for a battery can be produced by a conventionally known method except for the use of the positive electrode paste of the present disclosure.

The positive electrode coating or the positive electrode for a battery may be produced by, e.g., applying the positive electrode paste to a current collector such as aluminum foil, and then drying the positive electrode paste. In this case, the positive electrode paste may be subjected to compaction with a pressing machine to increase the density of the positive electrode coating. The positive electrode paste may be applied with, e.g., a die head, a comma reverse roll, a direct roll, or a gravure roll. The applied positive electrode paste may be dried by, e.g., heating, airflow, or infrared radiation, which may be used alone or in combination. The drying of the applied positive electrode paste is performed at a temperature at which the compound (B) and the organic solvent (C) cannot be present in the positive electrode paste after the drying time has passed. The drying temperature is not particularly limited as long as it is equal to or lower than the thermal decomposition temperature of the binder resin in the environment (atmospheric pressure) in which the drying process is performed. The drying temperature is preferably equal to or higher than the boiling point of the compound (B), and more preferably equal to or higher than the boiling point of the organic solvent (C). Specifically, the drying temperature is preferably 60 to 220° C., and more preferably 80 to 200° C. and the drying time is preferably 10 to 90 minutes, and more preferably 20 to 60 minutes under normal pressure. The positive electrode can be pressed with, e.g., a roll press machine.

EXAMPLES

Hereinafter, Examples of the present disclosure and Comparative Examples will be described, but the present disclosure is not limited to the following examples.
1. Measurement Method of Each Parameter
[Measurement of Weight Average Molecular Weight of Polymer]

The weight average molecular weight of the polymer was measured by a GPC method. The detailed conditions are as follows.
- Measuring device: HLC-8320 GPC (manufactured by Tosoh Corporation)
- Column: α-M+α-M (manufactured by Tosoh Corporation)
- Column temperature: 40° C.
- Detector: differential refractometer
- Eluant: N,N-dimethylformamide (DMF) solution containing 60 mmol/L of $H_3PO_4$ and 50 mmol/L of LiBr
- Flow rate: 1 mL/min
- Standard sample used for calibration curve: polystyrene
- Sample solution: DMF solution containing 0.5 wt % of solid content of copolymer
- Amount of sample solution injected: 100 μL

[Measurement of Viscosity of Conductive Material Slurry]

The viscosity (25° C.) of the conductive material slurry was measured at a shear rate of 0.1 to 1000 $s^{-1}$ by using a rheometer MCR 302 (manufactured by Anton Paar GmbH) equipped with a parallel plate PP50. The viscosity of the conductive material slurry at a shear rate of 1 $s^{-1}$ was recorded and shown in Tables 5, 7, and 9.

[Measurement of Viscosity of Positive Electrode Paste]

The viscosity (25° 0) of the positive electrode paste was measured at a shear rate of 0.1 to 1000 $s^{-1}$ by using a rheometer MCR 302 (manufactured by Anton Paar GmbH) equipped with a parallel plate (diameter: 50 mm). The viscosity of the positive electrode paste at a shear rate of 1 $s^{-1}$ was recorded and shown in Tables 6, 8, and 10.

[Measurement of Resistance Value of Positive Electrode Coating]

The positive electrode paste was dropped on a polyester film and applied uniformly to the polyester film with a 100 μm applicator. The coated polyester film was dried at 100° C. for 1 hour, so that a positive electrode coating with a thickness of 40 μm was obtained.

The volume resistance value of the positive electrode coating was measured at a limiting voltage of 10 V by using Loresta-GP (manufactured by Mitsubishi Chemical Analytech Co., Ltd.) equipped with a PSP probe. Tables 6, 8, and 10 show the results.

2. Preparation of Dispersant Composition
[Raw Material Used]

The details of the acrylic polymer (A) and its raw materials, the compound (B), etc. that were used to prepare dispersant compositions 1 to 23 in Table 3 are described as follows and shown in Tables 1 and 2.

(Monomer a)
- SMA stearyl methacrylate (manufactured by SHIN-NAKAMURA CHEMICAL Co., Ltd., product number: NK-Ester S)
- BeA: behenyl acrylate (manufactured by SHIN-NAKAMURA CHEMICAL Co., Ltd., product number: NK-Ester A-BH)

(Monomer b)
- HEMA: 2-hydroxyethylmethacrylate (manufactured by FUJIFILM Wako Pure Chemical Corporation)
- PEGMA (EO2): methoxy polyethylene glycol methacrylate (manufactured by SHIN-NAKAMURA CHEMICAL Co., Ltd., product number: NK-Ester M-20G, average number of moles of ethylene oxide added: 2)
- 4-VPy: 4-vinylpyridine (manufactured by Tokyo Chemical Industry Co., Ltd.)
- MAAm: methacrylamide (manufactured by Tokyo Chemical Industry Co., Ltd.)

(Homopolymer)
- PVP: polyvinylpyrrolidone (K-30, manufactured by FUJIFILM Wako Pure Chemical Corporation)

(Solvent)
- NMP: N-methyl-2-pyrrolidone (manufactured by FUJIFILM Wako Pure Chemical Corporation)

(Polymerization Initiator)
- V-65B: 2,2'-azobis(2,4-dimethylvaleronitrile)(manufactured by FUJIFILM Wako Pure Chemical Corporation)

TABLE 1

| Constitutional unit | | Monomer | Formula (3) | | | Formula (5) | | | Formula (4) | | | | | |
|---|---|---|---|---|---|---|---|---|---|---|---|---|---|---|
| | | | $R^{10}$ | $R^7/R^8/R^9$ | $X^1$ | $R^{16}/R^{17}/R^{18}$ | $X^3$ | | $R^{11}/R^{12}/R^{13}$ | $X^2$ | $R^{14}$ | p | $R^{15}$ |
| a | $a^1$ | SMA | C18H37 | H/H/CH3 | O | | | | | | | | |
| | $a^2$ | BeA | C22H45 | H/H/H | O | | | | | | | | |
| b1 | $b^{11}$ | HEMA | | | | | | | H/H/CH3 | O | CH2CH2— | 1 | H |
| | $b^{13}$ | PEGMA (EO2) | | | | | | | H/H/CH3 | O | —CH2CH2— | 2 | —CH3 |
| b2 | $b^{21}$ | 4-VP y | | | | H/H/H | 4-pyridinyl group | | | | | | |
| | $b^{23}$ | MAAm | | | | H/H/CH3 | —CONH2 | | | | | | |

TABLE 2

| Compound (B) | Compound name | R1 | R2 | R3 | R4 | R5 | R6 |
|---|---|---|---|---|---|---|---|
| E | Ethanolamine | Formula (2) | H | H | H | H | H |
| F | N-methylethanolamine | Formula (2) | CH3 | H | H | H | H |
| G | N-ethylethanolamine | Formula (2) | C2H5 | H | H | H | H |

TABLE 2-continued

| Compound (B) | Compound name | R1 | R2 | R3 | R4 | R5 | R6 |
|---|---|---|---|---|---|---|---|
| H | 2-amino-1-propanol | Formula (2) | H | CH3 | H | H | H |
| I | 2-amino-2-methyl-1-propanol | Formula (2) | H | CH3 | CH3 | H | H |
| J | 1-amino-2-propanol | Formula (2) | H | H | H | CH3 | H |
| K | 2-amino-1,3-propanediol | Formula (2) | H | —CH2OH | H | H | H |
| L | Diethanolamine | Formula (2) | —CH2CH2—OH | H | H | H | H |
| M | n-octylamine | H | C8H17 | | | | |
| N | N,N-dimethylethanolamine | | | | | | |
| O | N-cyclohexylethanolamine | Formula (2) | C6H11 | H | H | H | H |

[Example of Synthesis of Acrylic Polymer (A) of Dispersant Composition 1]

A mixed solution containing 33.9 g of SMA (monomer $a^1$), 27.7 g of HEMA (monomer $b^{11}$), and 25.2 g of NMP (solvent) was prepared as a dropping monomer solution 1. A mixed solution containing 15.4 g of MAAm (monomer $b^{23}$) and 34.3 g of NMP was prepared as a dropping monomer solution 2. A mixed solution containing 1.28 g of V-65B (polymerization initiator) and 12.8 g of NMP (solvent) was prepared as a dropping initiator solution.

A separable flask equipped with a reflux tube, an agitator, a thermometer, a nitrogen introduction tube, and a dropping funnel was used. The inside of the flask (vessel) was replaced with nitrogen for 1 hour or more. Then, the dropping monomer solution 1, the dropping monomer solution 2, and the dropping initiator solution were each added dropwise to the vessel at 65° C. over 160 minutes. After completion of the dropping, the mixture was stirred for 1 hour while the temperature in the vessel was still maintained at 65° C. Subsequently, the temperature in the vessel was raised to 80° C., and the mixture was further stirred for 2 hours. Next, the mixture was diluted with 42.6 g of NMP (solvent), thereby providing an acrylic polymer (A) solution of a dispersant composition 1. The acrylic polymer (A) solution had a non-volatile content of 40% by mass and a weight average molecular weight of 34000.

[Example of Synthesis of Acrylic Polymer (A) of Dispersant Composition 2 to 22]

Acrylic polymer (A) solutions of dispersant compositions 2 to 22 were obtained in the same manner as described in [Example of synthesis of acrylic polymer (A) of dispersant composition 1], except that the mass ratios of the monomers used for the synthesis of each of the acrylic polymers (A) of the dispersant compositions 2 to 22 in the preparation of the dropping monomer solutions were set to the values shown in Table 3.

The dropping monomer solution 2 was not prepared when the monomer was composed of two components. In the synthesis of the acrylic polymers (A) of the dispersant compositions 10 and 15, a dropping monomer solution 1 containing SMA (monomer $a^1$) and PEGMA (EO2) (monomer $b^{13}$) and a dropping monomer solution 2 containing HEMA (monomer $b^{11}$) were prepared. In the synthesis of the acrylic polymer (A) of the dispersant composition 11, a dropping monomer solution 1 containing SMA (monomer $a^1$) and 4-Vpy (monomer $b^{21}$) and a dropping monomer solution 2 containing MAAm (monomer $b^{23}$) were prepared. In the synthesis of the acrylic polymers (A) of the dispersant compositions 12 and 14, a dropping monomer solution 1 containing SMA (monomer $a^1$) and PEGMA (EO2)(monomer $b^{13}$) and a dropping monomer solution 2 containing MAAm (monomer $b^{23}$) were prepared.

[Example of Preparation of Dispersant Composition 1 to 23]

The acrylic polymer (A) or PVP shown in Table 3, the compound (B) shown in Tables 2 and 3, and the organic solvent (C) (NMP) shown in Table 3 were mixed uniformly, so that the dispersant compositions 1 to 23 were prepared. Table 3 shows the content (effective content, mass %) of each component in each of the dispersant compositions.

TABLE 3

| | Dispersant (acrylic polymer (A) or PVP) | | | | | | | | Compound (B) or its comparative compound | | | Organic solvent (C) | |
|---|---|---|---|---|---|---|---|---|---|---|---|---|---|
| | Configuration | | | Content of each constitutional unit in all constitutional units of dispersant (mass %) | | | Molecular weight Mw | Content (mass %) | | Content (mass %) | Content of compound (B) or its comparative compound with respect to 100 parts by mass of dispersant (parts by mass) | | |
| Dispersant composition | Constitutional unit a | Constitutional unit b1 | Constitutional unit b2 | Constitutional unit a | Constitutional unit b1 | Constitutional unit b2 | | | Type | | | Type | Content (mass %) |
| Dispersant composition 1 | $a^1$ | $b^{11}$ | — $b^{23}$ — | 40 | 30 | 30 | 38000 | 20 | E | 10 | 50 | NMP | 70 |
| Dispersant composition 2 | $a^1$ | $b^{11}$ | — $b^{23}$ — | 40 | 30 | 30 | 38000 | 20 | F | 10 | 50 | NMP | 70 |

TABLE 3-continued

| | Dispersant (acrylic polymer (A) or PVP) | | | | | | | Compound (B) or its comparative compound | | | Organic solvent (C) | |
|---|---|---|---|---|---|---|---|---|---|---|---|---|
| | Configuration | | | Content of each constitutional unit in all constitutional units of dispersant (mass %) | | | Molecular weight Mw | Content (mass %) | Type | Content (mass %) | Content of compound (B) or its comparative compound with respect to 100 parts by mass of dispersant (parts by mass) | Type | Content (mass %) |
| Dispersant composition | Constitutional unit a | Constitutional unit b1 | Constitutional unit b2 | Constitutional unit a | Constitutional unit b1 | Constitutional unit b2 | | | | | | | |
| Dispersant composition 3 | a$^1$ | b$^{11}$ | — b$^{23}$ — | 40 | 30 | 30 | 38000 | 20 | G | 10 | 50 | NMP | 70 |
| Dispersant composition 4 | a$^1$ | b$^{11}$ | — b$^{23}$ — | 40 | 30 | 30 | 38000 | 20 | H | 10 | 50 | NMP | 70 |
| Dispersant composition 5 | a$^1$ | b$^{11}$ | — b$^{23}$ — | 40 | 30 | 30 | 38000 | 20 | I | 10 | 50 | NMP | 70 |
| Dispersant composition 6 | a$^1$ | b$^{11}$ | — b$^{23}$ — | 40 | 30 | 30 | 38000 | 20 | J | 10 | 50 | NMP | 70 |
| Dispersant composition 7 | a$^1$ | b$^{11}$ | — b$^{23}$ — | 40 | 30 | 30 | 38000 | 20 | K | 10 | 50 | NMP | 70 |
| Dispersant composition 8 | a$^1$ | b$^{11}$ | — b$^{23}$ — | 40 | 30 | 30 | 38000 | 20 | L | 10 | 50 | NMP | 70 |
| Dispersant composition 9 | a$^1$ | b$^{11}$ | — — — | 60 | 40 | — | 26500 | 20 | G | 10 | 50 | NMP | 70 |
| Dispersant composition 10 | a$^1$ | b$^{11}$ b$^{13}$ | — — | 50 | 30 | 20 | 29000 | 20 | G | 10 | 50 | NMP | 70 |
| Dispersant composition 11 | a$^1$ | — — | b$^{21}$ b$^{23}$ | 40 | 30 | 30 | 33000 | 20 | G | 10 | 50 | NMP | 70 |
| Dispersant composition 12 | a$^1$ | b$^{13}$ | — b$^{23}$ — | 50 | 25 | 25 | 36000 | 20 | G | 10 | 50 | NMP | 70 |
| Dispersant composition 13 | a$^2$ | b$^{11}$ | — b$^{23}$ — | 50 | 25 | 25 | 41000 | 20 | G | 10 | 50 | NMP | 70 |
| Dispersant composition 14 | a$^1$ | b$^{13}$ | — b$^{23}$ — | 50 | 25 | 25 | 36000 | 20 | I | 10 | 50 | NMP | 70 |
| Dispersant composition 15 | a$^1$ | b$^{11}$ b$^{13}$ | — — | 50 | 30 | 20 | 29000 | 20 | I | 10 | 50 | NMP | 70 |
| Dispersant composition 16 | a$^1$ | b$^{11}$ | — b$^{23}$ — | 50 | 25 | 25 | 36000 | 20 | I | 2.5 | 12.5 | NMP | 77.5 |
| Dispersant composition 17 | a$^1$ | b$^{11}$ | — b$^{23}$ — | 50 | 25 | 25 | 36000 | 20 | I | 20 | 100 | NMP | 60 |
| Dispersant composition 18 | a$^1$ | b$^{11}$ | — b$^{23}$ — | 50 | 25 | 25 | 36000 | 20 | I | 40 | 200 | NMP | 40 |
| Dispersant composition 19 (Comp. Ex.) | a$^1$ | b$^{11}$ | — b$^{23}$ — | 50 | 25 | 25 | 36000 | 20 | — | 0 | 0 | NMP | 80 |

TABLE 3-continued

| | Dispersant (acrylic polymer (A) or PVP) | | | | | | | Compound (B) or its comparative compound | | | Organic solvent (C) | |
|---|---|---|---|---|---|---|---|---|---|---|---|---|
| | Configuration | | | Content of each constitutional unit in all constitutional units of dispersant (mass %) | | | Mo-lecular weight Mw | Content (mass %) | | Content (mass %) | Content of compound (B) or its comparative compound with respect to 100 parts by mass of dispersant (parts by mass) | |
| Dispersant composition | Constitutional unit a | Constitutional unit b1 | Constitutional unit b2 | Constitutional unit a | Constitutional unit b1 | Constitutional unit b2 | | | Type | | | Type | Content (mass %) |
| Dispersant composition 20 (Comp. Ex.) | a$^1$ | b$^{11}$ | b$^{23}$ | 50 | 25 | 25 | 36000 | 20 | M | 10 | 50 | NMP | 70 |
| Dispersant composition 21 (Comp. Ex.) | a$^1$ | b$^{11}$ | b$^{23}$ | 50 | 25 | 25 | 36000 | 20 | N | 10 | 50 | NMP | 70 |
| Dispersant composition 22 (Comp. Ex.) | a$^1$ | b$^{11}$ | b$^{23}$ | 50 | 25 | 25 | 36000 | 20 | O | 10 | 50 | NMP | 70 |
| Dispersant composition 23 (Comp. Ex.) | | | | PVP | | | 40000 | 20 | E | 10 | 50 | NMP | 70 |

3. Conductive Material Used in Preparation of Conductive Material Slurry 1 to 29

The details of the conductive materials that were used to prepare conductive material slurries 1 to 29 in Tables 5, 7, and 9 are shown in Table 4.

TABLE 4

| Conductive material | Type of conductive material | Maker | Product name | Diameter (nm) | Specific Surface area (m$^2$/g) |
|---|---|---|---|---|---|
| P | CNT | Cabot* | HCNTs10 | 15 | 200-260 |
| Q | CNT | Cabot* | CNTs40 | 40 | 85-100 |
| R | CNT | Cnano | FT7010 | 9 | 200-300 |
| S | acetylene black | Denka | Li-435 | 23 | 133 |
| T | graphene foam | Cabot* | graphene nanosheet (GNS) | 7500 (median diameter) | 500< |

*Cabot Performance Materials (Shenzhen) Co., Ltd.

4. Preparation of Conductive Material Slurry 1 to 25 (Example 1 to 19, Comparative Example 1 to 6)

Example 1

First, 5 g of conductive materials P, which are MW carbon nanotubes (multi-walled carbon nanotubes HCNTs10 manufactured by Cabot Corporation, average length: 5 to 12 μm (catalog value)) as fibrous carbon nanostructures, were mixed with 5 g of the dispersant composition 1 and 90 g of NMP (additional solvent) to prepare a coarse dispersion. The coarse dispersion was placed in a high-pressure homogenizer (manufactured by Beryu Corporation, product name: "BERYU MINT") equipped with a multi-stage pressure regulator (multi-stage step-down transformer) for applying a back pressure during dispersion. Then, the coarse dispersion was subjected to a dispersion treatment at a pressure of 100 MPa. Specifically, a shear force was applied to the coarse dispersion so that the MW carbon nanotubes were dispersed, while the back pressure was being applied. Thus, a conductive material slurry 1 (carbon nanotube dispersion) in Example 1 was prepared as a fibrous carbon nanostructure dispersion. The dispersion treatment was performed by circulating the dispersion in such a way that the dispersion was discharged from and injected back into the high-pressure homogenizer. This circulation was repeated 20 times. The dispersion was discharged and injected at 30 g/min.

The viscosity of the conductive material slurry 1 was measured at 25° C. and was found to be 840 mPa·s.

Example 2 to 19, Comparative Example 1 to 6

Conductive material slurries 2 to 25 (carbon nanotube dispersions) in Examples 2 to 19 and Comparative Examples 1 to 6 were prepared in the same manner as Example 1, except that the types and contents of the dispersant composition, the conductive materials, and the additional solvent were changed as shown in Tables 3 to 5.

Table 5 shows the content (effective content, mass %) of each component in each of the conductive material slurries thus prepared.

TABLE 5

| | Conductive material slurry | Dispersant composition Type | Content (mass %) | Content of compound (B) or its comparative compound with respect to 100 parts by mass of dispersant (parts by mass) | Content of compound (B) or its comparative compound with respect to 100 parts by mass of conductive material (D) (parts by mass) | Conductive material (D) Type | Content (mass %) | Additional solvent Type | Content (mass %) | Viscosity (mPa·s) |
|---|---|---|---|---|---|---|---|---|---|---|
| Ex. 1 | Conductive material slurry 1 | Dispersant composition 1 | 5 | 50 | 10 | P | 5 | NMP | 90 | 840 |
| Ex. 2 | Conductive material slurry 2 | Dispersant composition 2 | 5 | 50 | 10 | P | 5 | NMP | 90 | 790 |
| Ex. 3 | Conductive material slurry 3 | Dispersant composition 3 | 5 | 50 | 10 | P | 5 | NMP | 90 | 740 |
| Ex. 4 | Conductive material slurry 4 | Dispersant composition 4 | 5 | 50 | 10 | P | 5 | NMP | 90 | 890 |
| Ex. 5 | Conductive material slurry 5 | Dispersant composition 5 | 5 | 50 | 10 | P | 5 | NMP | 90 | 720 |
| Ex. 6 | Conductive material slurry 6 | Dispersant composition 6 | 5 | 50 | 10 | P | 5 | NMP | 90 | 840 |
| Ex. 7 | Conductive material slurry 7 | Dispersant composition 7 | 5 | 50 | 10 | P | 5 | NMP | 90 | 860 |
| Ex. 8 | Conductive material slurry 8 | Dispersant composition 8 | 5 | 50 | 10 | P | 5 | NMP | 90 | 800 |
| Ex. 9 | Conductive material slurry 9 | Dispersant composition 9 | 5 | 50 | 10 | P | 5 | NMP | 90 | 760 |
| Ex. 10 | Conductive material slurry 10 | Dispersant composition 10 | 5 | 50 | 10 | P | 5 | NMP | 90 | 860 |
| Ex. 11 | Conductive material slurry 11 | Dispersant composition 11 | 5 | 50 | 10 | P | 5 | NMP | 90 | 730 |
| Ex. 12 | Conductive material slurry 12 | Dispersant composition 12 | 5 | 50 | 10 | P | 5 | NMP | 90 | 780 |
| Ex. 13 | Conductive material slurry 13 | Dispersant composition 13 | 5 | 50 | 10 | P | 5 | NMP | 90 | 720 |
| Ex. 14 | Conductive material slurry 14 | Dispersant composition 14 | 5 | 50 | 10 | P | 5 | NMP | 90 | 820 |
| Ex. 15 | Conductive material slurry 15 | Dispersant composition 15 | 5 | 50 | 10 | P | 5 | NMP | 90 | 810 |
| Ex. 16 | Conductive material slurry 16 | Dispersant composition 16 | 5 | 12.5 | 2.5 | P | 5 | NMP | 90 | 1050 |
| Ex. 17 | Conductive material slurry 17 | Dispersant composition 17 | 5 | 100 | 20 | P | 5 | NMP | 90 | 450 |
| Ex. 18 | Conductive material slurry 18 | Dispersant composition 18 | 5 | 200 | 40 | P | 5 | NMP | 90 | 400 |
| Ex. 19 | Conductive material slurry 19 | Dispersant composition 5 | 5 | 50 | 10 | Q, R | 2.5, 2.5 | NMP | 90 | 650 |
| Comp. Ex. 1 | Conductive material slurry 20 | Dispersant composition 19 | 5 | 0 | 0 | P | 5 | NMP | 90 | 8500 |
| Comp. Ex. 2 | Conductive material slurry 21 | Dispersant composition 20 | 5 | 50 | 10 | P | 5 | NMP | 90 | 4500 |
| Comp. Ex. 3 | Conductive material slurry 22 | Dispersant composition 21 | 5 | 50 | 10 | P | 5 | NMP | 90 | 6300 |
| Comp. Ex. 4 | Conductive material slurry 23 | Dispersant composition 22 | 5 | 50 | 10 | P | 5 | NMP | 90 | 6300 |

TABLE 5-continued

| | | Dispersant composition | | | Conductive material (D) | | Additional solvent | | |
|---|---|---|---|---|---|---|---|---|---|
| Conductive material slurry | Type | Content (mass %) | Content of compound (B) or its comparative compound with respect to 100 parts by mass of dispersant (parts by mass) | Content of compound (B) or its comparative compound with respect to 100 parts by mass of conductive material (D) (parts by mass) | Type | Content (mass %) | Type | Content (mass %) | Viscosity (mPa·s) |
| Comp. Ex. 5 Conductive material slurry 24 | Dispersant composition 23 | 5 | 50 | 10 | P | 5 | NMP | 90 | 1550 |
| Comp. Ex. 6 Conductive material slurry 25 | Dispersant composition 19 | 5 | 0 | 0 | Q, R | 2.5, 2.5 | NMP | 90 | 7400 |

5. Preparation of Positive Electrode Paste (Example 20 to 38, Comparative Example 7 to 12)

Example 20

First, 2.04 g of the conductive material slurry 1 (Example 1), 0.50 g of NMP (additional solvent), and 3.8 g of an NMP solution of PVDF (solid content: 8%, KF polymer L #7208 manufactured by KUREHA CORPORATION, binder solution) were weighed in a 50 ml sample bottle and stirred uniformly with a spatula. Then, this mixture was blended with 15 g of NMC532 (lithium nickel manganese cobalt oxide, manufactured by NIPPON CHEMICAL INDUSTRIAL CO., LTD.) as a positive electrode active material, and stirred again with a spatula until they became homogeneous. The resulting mixture was further stirred with a rotation-revolution mixer (AR-100 manufactured by THINKY CORPORATION) for 10 minutes. Thus, a positive electrode paste (Example 20) was prepared. The mass ratio of the positive electrode active material, the binder (PVDF), the conductive materials (carbon nanotubes), and the dispersant was 97.24:1.97:0.66:0.13 (in terms of solid content). The solid content (% by mass) of the positive electrode paste was 72.3% by mass. In this case, the solid content of the positive electrode paste refers to a percent by mass of the solid content of the materials contained in the positive electrode paste, including the copolymer (dispersant), the positive electrode active material, the conductive materials, and the binder. The viscosity of the positive electrode paste was measured at 25° C. and was found to be 5.4 Pa·s.

Example 21 to 38, Comparative Example 7 to 12

Positive electrode pastes (Examples 21 to 38 and Comparative Examples 7 to 12) were prepared in the same manner as Example 20, except that the type of the conductive material slurry was changed to those shown in Table 6.

Table 6 shows the content (effective content, mass %) of each component in each of the positive electrode pastes thus prepared.

TABLE 6

| Positive electrode paste | Positive electrode active material | | Conductive material slurry | | Content of conductive material (D) in positive electrode paste (mass %) | Content of compound (B) or its comparative compound in positive electrode paste (mass %) | Binder solution | | Additional solvent | | Viscosity Pa·s | Resistance Ω·cm |
|---|---|---|---|---|---|---|---|---|---|---|---|---|
| | Type | Content (mass %) | Type | Content (mass %) | | | Type | Content (mass %) | Type | Content (mass %) | | |
| Ex. 20 | NMC532 | 70.29% | Conductive material slurry 1 | 9.56% | 0.478 | 0.0478 | PVDF8% solution | 17.81% | NMP | 2.34% | 5.45 | 45 |
| Ex. 21 | NMC532 | 70.29% | Conductive material slurry 2 | 9.56% | 0.478 | 0.0478 | PVDF8% solution | 17.81% | NMP | 2.34% | 5.12 | 40 |
| Ex. 22 | NMC532 | 70.29% | Conductive material slurry 3 | 9.56% | 0.478 | 0.0478 | PVDF8% solution | 17.81% | NMP | 2.34% | 4.92 | 36 |
| Ex. 23 | NMC532 | 70.29% | Conductive material slurry 4 | 9.56% | 0.478 | 0.0478 | PVDF8% solution | 17.81% | NMP | 2.34% | 5.25 | 45 |
| Ex. 24 | NMC532 | 70.29% | Conductive material slurry 5 | 9.56% | 0.478 | 0.0478 | PVDF8% solution | 17.81% | NMP | 2.34% | 4.79 | 40 |
| Ex. 25 | NMC532 | 70.29% | Conductive material slurry 6 | 9.56% | 0.478 | 0.0478 | PVDF8% solution | 17.81% | NMP | 2.34% | 4.98 | 35 |
| Ex. 26 | NMC532 | 70.29% | Conductive material slurry 7 | 9.56% | 0.478 | 0.0478 | PVDF8% solution | 17.81% | NMP | 2.34% | 4.79 | 38 |

TABLE 6-continued

| | Positive electrode active material | | Conductive material slurry | | | Content of compound (B) or its comparative compound in positive electrode paste (mass %) | Binder solution | | Additional solvent | | Viscosity Pa·s | Resistance Ω·cm |
|---|---|---|---|---|---|---|---|---|---|---|---|---|
| Positive electrode paste | Type | Content (mass %) | Type | Content (mass %) | Content of conductive material (D) in positive electrode paste (mass %) | | Type | Content (mass %) | Type | Content (mass %) | | |
| Ex. 27 | NMC532 | 70.29% | Conductive material slurry 8 | 9.56% | 0.478 | 0.0478 | PVDF8% solution | 17.81% | NMP | 2.34% | 4.65 | 31 |
| Ex. 28 | NMC532 | 70.29% | Conductive material slurry 9 | 9.56% | 0.478 | 0.0478 | PVDF8% solution | 17.81% | NMP | 2.34% | 4.98 | 30 |
| Ex. 29 | NMC532 | 70.29% | Conductive material slurry 10 | 9.56% | 0.478 | 0.0478 | PVDF8% solution | 17.81% | NMP | 2.34% | 4.18 | 27 |
| Ex. 30 | NMC532 | 70.29% | Conductive material slurry 11 | 9.56% | 0.478 | 0.0478 | PVDF8% solution | 17.81% | NMP | 2.34% | 4.52 | 29 |
| Ex. 31 | NMC532 | 70.29% | Conductive material slurry 12 | 9.56% | 0.478 | 0.0478 | PVDF8% solution | 17.81% | NMP | 2.34% | 5.45 | 45 |
| Ex. 32 | NMC532 | 70.29% | Conductive material slurry 13 | 9.56% | 0.478 | 0.0478 | PVDF8% solution | 17.81% | NMP | 2.34% | 4.85 | 33 |
| Ex. 33 | NMC532 | 70.29% | Conductive material slurry 14 | 9.56% | 0.478 | 0.0478 | PVDF8% solution | 17.81% | NMP | 2.34% | 5.85 | 41 |
| Ex. 34 | NMC532 | 70.29% | Conductive material slurry 15 | 9.56% | 0.478 | 0.0478 | PVDF8% solution | 17.81% | NMP | 2.34% | 5.65 | 41 |
| Ex. 35 | NMC532 | 70.29% | Conductive material slurry 16 | 9.56% | 0.478 | 0.0120 | PVDF8% solution | 17.81% | NMP | 2.34% | 6.18 | 65 |
| Ex. 36 | NMC532 | 70.29% | Conductive material slurry 17 | 9.56% | 0.478 | 0.0956 | PVDF8% solution | 17.81% | NMP | 2.34% | 5.38 | 39 |
| Ex. 37 | NMC532 | 70.29% | Conductive material slurry 18 | 9.56% | 0.478 | 0.1912 | PVDF8% solution | 17.81% | NMP | 2.34% | 4.80 | 40 |
| Ex. 38 | NMC532 | 70.29% | Conductive material slurry 19 | 9.56% | 0.478 | 0.0478 | PVDF8% solution | 17.81% | NMP | 2.34% | 4.20 | 50 |
| Comp. Ex. 7 | NMC532 | 70.29% | Conductive material slurry 20 | 9.56% | 0.478 | 0.0000 | PVDF8% solution | 17.81% | NMP | 2.34% | 23.76 | 120 |
| Comp. Ex. 8 | NMC532 | 70.29% | Conductive material slurry 21 | 9.56% | 0.478 | 0.0478 | PVDF8% solution | 17.81% | NMP | 2.34% | 22.03 | 105 |
| Comp. Ex. 9 | NMC532 | 70.29% | Conductive material slurry 22 | 9.56% | 0.478 | 0.0478 | PVDF8% solution | 17.81% | NMP | 2.34% | 18.14 | 95 |
| Comp. Ex. 10 | NMC532 | 70.29% | Conductive material slurry 23 | 9.56% | 0.478 | 0.0478 | PVDF8% solution | 17.81% | NMP | 2.34% | 16.50 | 88 |
| Comp. Ex. 11 | NMC532 | 70.29% | Conductive material slurry 24 | 9.56% | 0.478 | 0.0478 | PVDF8% solution | 17.81% | NMP | 2.34% | 10.50 | 108 |
| Comp. Ex. 12 | NMC532 | 70.29% | Conductive material slurry 25 | 9.56% | 0.478 | 0.0478 | PVDF8% solution | 17.81% | NMP | 2.34% | 18.50 | 85 |

As shown in Table 5, the visosities of the conductive material slurries 1 to 19 (carbon nanotube dispersions) in Examples 1 to 19 are lower than those of the conductive material slurries 20 to 23 (carbon nanotube dispersions) in Comparative Examples 1 to 4. The results confirm that the presence of the compound (B) can improve the dispersibility of the carbon nanotubes in Examples 1 to 19.

As shown in Table 6, the viscosities of the positive electrode pastes in Examples 20 to 38, respectively containing the conductive material slurries 1 to 19 (carbon nanotube dispersions), are lower than those of the positive electrode pastes in Comparative Examples 7 to 12, respectively containing the conductive material slurries 20 to 25 (carbon nanotube dispersions). The resistance values of the positive electrode coatings produced by using the positive electrode pates in Examples 20 to 38 are lower than those of the positive electrode coatings produced by using the positive electrode pastes in Comparative Examples 7 to 12.

6. Preparation of Conductive Material Slurry 26 to 27 (Example 39, Comparative Example 13)

Example 39

First, 1.5 g of the dispersant composition 3 and 25.5 g of NMP (additional solvent) were weighed in a container and mixed uniformly. Then, 3 g of the conductive materials S was gradually added to the mixture while stirring. The resulting mixture was further mixed with a rotation-revolution mixer for 5 minutes, and subsequently stirred with a spatula. This operation was repeated three times, and thus a uniform acetylene black slurry (conductive material slurry 26, Example 39) was prepared.

Comparative Example 13

An acetylene black slurry (conductive material slurry 27, Comparative Example 13) was prepared in the same manner as Example 39, except that the dispersant composition 19 was used.

Table 7 shows the content (effective content, mass %) of each component (i.e., the dispersant composition, the conductive materials, and the solvent) in each of the conductive material slurries thus prepared.

TABLE 7

| Acetylene black slurry | | Dispersant composition | | Conductive material | | Additional solvent | | Viscosity mPa · s |
|---|---|---|---|---|---|---|---|---|
| | | Type | Content (mass %) | Type | Content (mass %) | Type | Content (mass %) | |
| Ex. 39 | Conductive material slurry 26 | Dispersant composition 3 | 5 | S | 10 | NMP | 85 | 85 |
| Comp. Ex. 13 | Conductive material slurry 27 | Dispersant composition 19 | 5 | S | 10 | NMP | 85 | 145 |

7. Preparation of Positive Electrode Paste (Example 40, Comparative Example 14)

Example 40

First, 2.06 g of the conductive material slurry 26 (Example 39) and 5.15 g of an NMP solution of PVDF (solid content: 8%, KF polymer L #7208 manufactured by KUREHA CORPORATION, binder solution) were weighed in a container and mixed with a rotation-revolution mixer for 5 minutes. Then, this mixture was blended with 20 g of NMC532 (lithium nickel manganese cobalt oxide, manufactured by NIPPON CHEMICAL INDUSTRIAL CO., LTD.) as a positive electrode active material, and stirred with a spatula. The resulting mixture was further mixed with a rotation-revolution mixer for 5 minutes. Thus, a positive electrode paste (Example 40) with a solid content of 75.8% was prepared.

Comparative Example 14

A positive electrode paste (Comparative Example 14) was prepared in the same manner as Example 40, except that the type of the conductive material slurry was changed to that shown in Table 8.

Table 8 shows the content (effective content, mass %) of each component in each of the positive electrode pastes thus prepared.

TABLE 8

| Positive electrode paste | Positive electrode active material | | Conductive material slurry (acetylene black slurry) | | Binder solution | | Additional solvent | | Viscosity Pa · s | Resistance Q · cm |
|---|---|---|---|---|---|---|---|---|---|---|
| | Type | Content (mass %) | Type | Content (mass %) | Type | Content (mass %) | Type | Content (mass %) | | |
| Ex. 40 | NMC532 | 73.50% | Conductive material slurry 26 | 7.58% | PVDF8% solution | 18.92% | NMP | 0.00% | 5.4 | 235 |
| Comp. Ex. 14 | NMC532 | 73.50% | Conductive material slurry 27 | 7.58% | PVDF8% solution | 18.92% | NMP | 0.00% | 8.9 | 250 |

As shown in Table 7, the viscosity of the conductive material slurry 26 (acetylene black slurry) in Example 39 is lower than that of the conductive material slurry 27 (acetylene black slurry) in Comparative Example 13. The results confirm that the presence of the compound (B) in the conductive material slurry 26 in Example 39 can improve the dispersibility of the acetylene black.

As shown in Table 8, the viscosity of the positive electrode paste in Example 40, containing the conductive material slurry 26 (acetylene black slurry), is lower than that of the positive electrode paste in Comparative Example 14, containing the conductive material slurry 27 (acetylene black slurry). The resistance value of the positive electrode coating produced by using the positive electrode paste in Example 40 is lower than that of the positive electrode coating produced by using the positive electrode paste in Comparative Example 14.

8. Preparation of Conductive Material Slurry 28 to 29 (Example 41, Comparative Example 15)

Example 41

First, 4.50 g of graphene (graphene nanosheet (GNS) manufactured by Cabot Performance Materials (Shenzhen) Co., Ltd.) and 2.25 g of the dispersant composition 3 were weighed in a 60 mL screw tube. Then, NMP was further added to the mixture so that the total amount was 30.0 g. This mixture was stirred, together with a 2 cm long stirrer chip, at 300 rpm for 15 minutes. Subsequently, the mixture was stirred with a stirrer in an ice bath and dispersed by using an ultrasonic homogenizer (US-300AT manufactured by NIHONSEIKI KAISHA LTD.) with an amplitude of 30 μm for 20 minutes. Thus, a graphene slurry (conductive material slurry 28, Example 41) was prepared.

Comparative Example 15

A graphene slurry (conductive material slurry 29, Comparative Example 15) was prepared in the same manner as Example 41, except that the dispersant composition 19 was used.

Table 9 shows the content (effective content, mass %) of each component (i.e., the dispersant composition, the conductive materials, and the solvent) in each of the conductive material slurries thus prepared.

[Measurement of Viscosity of Graphene Slurry]

The apparent viscosity of the graphene slurry was measured with a rheometer (MCR 302 manufactured by Anton Paar GmbH). The measurement was performed at a shear rate of 0.1 to 100 $s^{-1}$, followed by a shear rate of 100 to 0.1 $s^{-1}$. The measurement temperature was 25° C., and a parallel plate (diameter: 50 mm) was used as a rotor. The apparent viscosity measured at a shear rate of 10 $s^{-1}$, where the shear rate was in the range of 100 to 0.1 $s^{-1}$, was taken as the viscosity of the graphene slurry.

TABLE 9

| | | Dispersant composition | | Conductive material | | Additional solvent | | Viscosity |
|---|---|---|---|---|---|---|---|---|
| | Graphene slurry | Type | Content (mass %) | Type | Content (mass %) | Type | Content (mass %) | mPa · s |
| Ex. 41 | Conductive material slurry 28 | Dispersant composition 3 | 7.5 | T | 15 | NMP | 85 | 47.8 |
| Comp. Ex. 15 | Conductive material slurry 29 | Dispersant composition 19 | 7.5 | T | 15 | NMP | 85 | 849 |

9. Preparation of Positive Electrode Paste (Example 42, Comparative Example 16)

Example 42

First, 2.06 g of the conductive material slurry 28 (Example 41) and 5.15 g of an NMP solution of PVDF (solid content: 8%, KF polymer L #7208 manufactured by KUREHA CORPORATION, binder solution) were weighed in a container and mixed with a rotation-revolution mixer for 5 minutes. Then, this mixture was blended with 20 g of NMC532 (lithium nickel manganese cobalt oxide, manufactured by NIPPON CHEMICAL INDUSTRIAL CO., LTD.) as a positive electrode active material, and stirred with a spatula. The resulting mixture was further mixed with a rotation-revolution mixer for 5 minutes. Thus, a positive electrode paste (Example 42) with a solid content of 75.8% was prepared.

Comparative Example 16

A positive electrode paste (Comparative Example 16) was prepared in the same manner as Example 42, except that the type of the conductive material slurry was changed to the conductive material slurry 29 (Comparative Example 15) shown in Table 10.

Table 10 shows the content (effective content, mass %) of each component in each of the positive electrode pastes thus prepared.

TABLE 10

| Positive electrode paste | Positive electrode active material Type | Positive electrode active material Content (mass %) | Conductive material slurry (graphene slurry) Type | Conductive material slurry (graphene slurry) Content (mass %) | Binder solution Type | Binder solution Content (mass %) | Additional solvent Type | Additional solvent Content (mass %) | Viscosity Pa · s | Resistance Ω · cm |
|---|---|---|---|---|---|---|---|---|---|---|
| Ex. 42 | NMC532 | 73.50% | Conductive material slurry 28 | 7.58% | PVDF8% solution | 18.92% | NMP | 0.00% | 40.8 | 3500 |
| Comp. Ex. 16 | NMC532 | 73.50% | Conductive material slurry 29 | 7.58% | PVDF8% solution | 18.92% | NMP | 0.00% | 57.9 | 5600 |

As shown in Table 9, the viscosity of the conductive material slurry 28 (graphene slurry) in Example 41 is lower than that of the conductive material slurry 29 (graphene slurry) in Comparative Example 15. The results confirm that the presence of the compound (B) in the conductive material slurry 28 in Example 41 can improve the dispersibility of the graphene.

As shown in Table 10, the viscosity of the positive electrode paste in Example 42, containing the conductive material slurry 28 (graphene slurry), is lower than that of the positive electrode paste in Comparative Example 16, containing the conductive material slurry 29 (graphene slurry). The resistance value of the positive electrode coating produced by using the positive electrode paste in Example 42 is lower than that of the positive electrode coating produced by using the positive electrode paste in Comparative Example 16.

INDUSTRIAL APPLICABILITY

The dispersant composition of the present disclosure can improve the dispersibility of the carbon material-based conductive materials, and thus can reduce the viscosity of the carbon material-based conductive material slurry. Moreover, the use of the dispersant composition of the present disclosure in the preparation of the positive electrode paste can reduce the viscosity of the positive electrode paste, and can also contribute to a lower resistance of the positive electrode coating.

The invention claimed is:

1. A dispersant composition for an electrode of a power storage device, comprising:
    an acrylic polymer (A);
    a compound (B) that is a primary or secondary amine including at least one selected from the group consisting of N-ethylethanolamine, 2-amino-1-propanol, 2-amino-2-methyl-1-propanol, 1-amino-2-propanol, and 2-amino-1,3-propanediol; and
    an organic solvent (C),
    wherein the acrylic polymer (A) contains a constitutional unit a represented by the following formula (3),
    the acrylic polymer (A) further contains at least one constitutional unit b selected from the group consisting of a constitutional unit b1 represented by the following formula (4) and a constitutional unit b2 represented by the following formula (5),
    a content of the constitutional unit a represented by the formula (3) in all constitutional units of the acrylic polymer (A) is 10% by mass or more and 80% by mass or less,
    a content of the constitutional unit b in all constitutional units of the acrylic polymer (A) is 20% by mass or more and 90% by mass or less; and

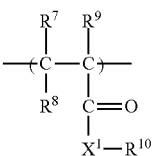
(3)

in the formula (3), $R^7$, $R^8$, and $R^9$ are the same or different and represent a hydrogen atom, a methyl group, or an ethyl group, $R^{10}$ represents a hydrocarbon group having 1 to 30 carbon atoms, and $X^1$ represents an oxygen atom or —NH—;

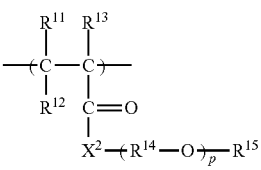
(4)

(5)
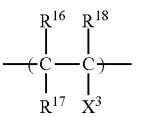

in the formula (4), $R^{11}$, $R^{12}$, and $R^{13}$ are the same or different and represent a hydrogen atom, a methyl group, or an ethyl group, $X^2$ represents an oxygen atom, $R^{14}$ represents a linear or branched alkylene group having 2 to 4 carbon atoms, p represents 1 to 8, and $R^{15}$ represents a hydrogen atom or a methyl group, and in the formula (5), $R^{16}$, $R^{17}$, and $R^{18}$ are the same or different and represent a hydrogen atom, a methyl group, or an ethyl group, and $X^3$ represents an amide group or a pyridinyl group that may have a hydrocarbon group having 1 to 4 carbon atoms.

2. The dispersant composition according to claim 1, wherein a weight average molecular weight of the acrylic polymer (A) is 10000 or more and 300000 or less.

3. The dispersant composition according to claim 1, wherein a content of the compound (B) is 10 parts by mass or more and 210 parts by mass or less with respect to 100 parts by mass of the acrylic polymer (A).

4. The dispersant composition according to claim 1, wherein a monomer that forms the constitutional unit a is at least one selected from the group consisting of stearyl (meth)acrylate and behenyl (meth)acrylate.

5. The dispersant composition according to claim 1, wherein a monomer that forms the constitutional unit b1 is at least one selected from the group consisting of 2-hydroxyethyl methacrylate, methoxy polyethylene glycol (meth) acrylate, and methoxyethyl methacrylate.

6. The dispersant composition according to claim 1, wherein a monomer that forms the constitutional unit b2 is at least one selected from the group consisting of 4-vinylpyridine and methacrylamide.

7. The dispersant composition according to claim 1, wherein a total content of the constitutional unit a and the constitutional unit b in all constitutional units of the acrylic polymer (A) is 30% by mass or more.

8. The dispersant composition according to claim 1, wherein a content of the acrylic polymer (A) in the dispersant composition is 5% by mass or more and 50% by mass or less.

9. The dispersant composition according to claim 1, wherein a mass ratio A/B of the acrylic polymer (A) to the compound (B) in the dispersant composition is 0.1 or more and 10 or less.

10. The dispersant composition according to claim 1, wherein a content of the organic solvent (C) in the dispersant composition is 30% by mass or more and 80% by mass or less.

11. A carbon material-based conductive material slurry comprising:
    carbon material-based conductive materials (D); and
    the dispersant composition according to claim 1.

12. The carbon material-based conductive material slurry according to claim 11, wherein the carbon material-based conductive materials (D) include at least one selected from the group consisting of carbon black, carbon nanotubes, and graphene.

13. A positive electrode paste for a power storage device, comprising:
    the dispersant composition according to claim 1.

14. A method for producing a positive electrode coating by using the positive electrode paste according to claim 13.

* * * * *